(12) United States Patent
Grossman et al.

(10) Patent No.: US 10,111,563 B2
(45) Date of Patent: Oct. 30, 2018

(54) MECHANISM FOR CLEANING SOLAR COLLECTOR SURFACES

(71) Applicant: SunPower Corporation, San Jose, CA (US)

(72) Inventors: Marc Grossman, Davis, CA (US); Cedric Jeanty, Davis, CA (US)

(73) Assignee: SUNPOWER CORPORATION, San Jose, CA (US)

( * ) Notice: Subject to any disclaimer, the term of this patent is extended or adjusted under 35 U.S.C. 154(b) by 1182 days.

(21) Appl. No.: 13/745,722

(22) Filed: Jan. 18, 2013

(65) Prior Publication Data

US 2014/0202492 A1    Jul. 24, 2014

(51) Int. Cl.
*B08B 7/00* (2006.01)
*B08B 7/04* (2006.01)
(Continued)

(52) U.S. Cl.
CPC ........... *A47L 7/0004* (2013.01); *A47L 11/38* (2013.01); *B08B 1/002* (2013.01); *B08B 3/026* (2013.01);
(Continued)

(58) Field of Classification Search
CPC ......... B08B 1/002; B08B 3/026; A47L 11/38; A47L 7/0004; Y02E 10/40; Y02E 10/52; F24J 2/461
See application file for complete search history.

(56) References Cited

U.S. PATENT DOCUMENTS

| 96,219 A | 10/1869 | Gibson |
| 556,722 A | 3/1896 | Ford |

(Continued)

FOREIGN PATENT DOCUMENTS

| BE | 1010099 A6 | 12/1997 |
| DE | 2737619 A1 | 3/1979 |

(Continued)

OTHER PUBLICATIONS

International Search Report for PCT/US2014/011918, dated May 8, 2014.

(Continued)

*Primary Examiner* — Alexander Markoff
(74) *Attorney, Agent, or Firm* — Oblon, McClelland, Maier & Neustadt, L.L.P.

(57) ABSTRACT

A system and method for cleaning a collector surface of a solar collector. The system includes a first liquid-dispensing unit configured to deliver a first spray of liquid to the collector surface. The system also includes a brush element having a longitudinal side oriented along a first direction and disposed adjacent to the first liquid-dispensing unit. A first squeegee element is oriented along the first direction and adjacent to the brush element. The first squeegee element, the brush element, and the first liquid-dispensing unit define a first cleaning area. A second squeegee element is oriented along the first direction and separated from the first squeegee element by a gap to define a second cleaning area. The system also includes a second liquid-dispensing unit configured to deliver a second spray of liquid to the second cleaning area located between the first and second squeegees.

7 Claims, 17 Drawing Sheets

(51) Int. Cl.
*A47L 7/00* (2006.01)
*B08B 1/00* (2006.01)
*B08B 3/02* (2006.01)
*A47L 11/38* (2006.01)
*F24J 2/46* (2006.01)

(52) U.S. Cl.
CPC ............... *F24J 2/461* (2013.01); *Y02E 10/40* (2013.01); *Y02E 10/52* (2013.01)

(56) References Cited

U.S. PATENT DOCUMENTS

| | | | |
|---|---|---|---|
| 1,035,250 A | | 8/1912 | Shannon |
| 1,982,345 A | * | 11/1934 | Kirby .................... A47L 1/02 |
| | | | 126/271.1 |
| 2,104,161 A | | 1/1938 | Koukal |
| 2,531,370 A | | 11/1950 | Thompson |
| 2,746,071 A | | 5/1956 | Charun |
| 2,893,044 A | | 7/1959 | Kurose |
| 3,158,885 A | | 12/1964 | Kammann et al. |
| 3,425,082 A | | 2/1969 | Hetman |
| 3,538,535 A | * | 11/1970 | Ginsburgh et al. ........ A47L 1/08 |
| | | | 15/302 |
| 3,551,930 A | | 1/1971 | Myers |
| 3,800,358 A | | 4/1974 | Ryan |
| 3,816,868 A | | 6/1974 | Dotsko |
| 3,971,091 A | | 7/1976 | Peren et al. |
| 4,154,680 A | | 5/1979 | Sommer |
| 4,168,557 A | | 9/1979 | Rasch et al. |
| 4,198,724 A | | 4/1980 | Fisher et al. |
| 4,321,419 A | | 3/1982 | Hanafin |
| 4,596,061 A | * | 6/1986 | Henning ................ A47L 11/30 |
| | | | 15/322 |
| 4,664,212 A | | 5/1987 | Nagatsuka et al. |
| 4,817,233 A | | 4/1989 | Waldhauser |
| 5,020,188 A | | 6/1991 | Walton |
| 5,086,533 A | | 2/1992 | Kitahara |
| 5,271,682 A | * | 12/1993 | Realdon .................... A47L 1/08 |
| | | | 401/146 |
| 5,319,828 A | | 6/1994 | Waldhauser et al. |
| 5,337,434 A | | 8/1994 | Erlich |
| 5,351,355 A | | 10/1994 | Chiniara |
| 5,364,198 A | | 11/1994 | Skenderi |
| 5,366,038 A | | 11/1994 | Hidetsugu et al. |
| 5,416,944 A | | 5/1995 | Eriksson |
| 5,435,031 A | | 7/1995 | Minami et al. |
| 5,528,789 A | | 6/1996 | Rostamo |
| 5,561,883 A | | 10/1996 | Landry et al. |
| 5,699,576 A | | 12/1997 | Sohaiby |
| 5,940,927 A | | 8/1999 | Haegermarck et al. |
| 5,942,869 A | | 8/1999 | Katou et al. |
| 6,076,025 A | | 6/2000 | Ueno et al. |
| 6,102,145 A | | 8/2000 | Fisher |
| 6,102,615 A | | 8/2000 | Wilson, Sr. |
| 6,119,057 A | | 9/2000 | Kawagoe |
| 6,119,300 A | | 9/2000 | Schmid et al. |
| 6,338,013 B1 | | 1/2002 | Ruffner |
| 6,370,720 B1 | | 4/2002 | Jang |
| 6,412,133 B1 | | 7/2002 | Erlich et al. |
| 6,547,469 B2 | | 4/2003 | Vito |
| 6,553,610 B1 | * | 4/2003 | Shideler .................. A47L 5/36 |
| | | | 15/327.5 |
| 6,574,536 B1 | | 6/2003 | Kawagoe et al. |
| 6,668,951 B2 | | 12/2003 | Won |
| 6,692,171 B2 | | 2/2004 | Vito |
| 6,815,918 B2 | | 11/2004 | Porat et al. |
| 6,842,931 B2 | | 1/2005 | Porat et al. |
| 6,964,312 B2 | | 11/2005 | Maggio |
| 7,128,074 B2 | | 10/2006 | MacNeil et al. |
| 7,143,502 B2 | | 12/2006 | Porat et al. |
| 7,287,926 B2 | | 10/2007 | Demuth et al. |
| 7,530,754 B2 | | 5/2009 | Demuth et al. |
| 7,600,592 B2 | | 10/2009 | Goldenberg et al. |
| 7,617,557 B2 | | 11/2009 | Reindle |
| 7,617,564 B2 | | 11/2009 | Stuthers et al. |
| 7,761,954 B2 | | 7/2010 | Ziegler et al. |
| 7,775,312 B2 | | 8/2010 | Maggio |
| 7,861,352 B2 | | 1/2011 | Reindle |
| 7,900,308 B2 | | 3/2011 | Erlich et al. |
| 8,002,365 B2 | | 8/2011 | Jacobsen et al. |
| 8,032,978 B2 | | 10/2011 | Haegermarck |
| 8,046,101 B2 | | 10/2011 | Hisatani et al. |
| 8,051,528 B2 | | 11/2011 | Davis et al. |
| 8,074,320 B2 | | 12/2011 | Batchelder et al. |
| 8,096,723 B2 | | 1/2012 | Bae |
| 8,122,982 B2 | | 2/2012 | Morey et al. |
| 8,157,032 B2 | | 4/2012 | Gettings |
| 8,434,504 B2 | | 5/2013 | Simonette et al. |
| 2002/0066473 A1 | | 6/2002 | Levy et al. |
| 2002/0189871 A1 | | 12/2002 | Won |
| 2005/0000543 A1 | | 1/2005 | Taylor et al. |
| 2006/0225241 A1 | | 10/2006 | Phillips |
| 2007/0028405 A1 | | 2/2007 | Garti |
| 2007/0067930 A1 | | 3/2007 | Garti |
| 2008/0087299 A1 | | 4/2008 | Erlich et al. |
| 2008/0098553 A1 | | 5/2008 | Dayton et al. |
| 2009/0266353 A1 | | 10/2009 | Lee |
| 2009/0282642 A1 | | 11/2009 | Batchelder et al. |
| 2009/0288691 A1 | | 11/2009 | Hunt et al. |
| 2010/0000570 A1 | | 1/2010 | Merlins et al. |
| 2010/0043851 A1 | | 2/2010 | Levy et al. |
| 2010/0206294 A1 | | 8/2010 | Blair et al. |
| 2010/0293729 A1 | | 11/2010 | Lee |
| 2011/0094542 A1 | | 4/2011 | Gonzalez Rodriguez et al. |
| 2011/0094549 A1 | | 4/2011 | Lin |
| 2011/0137458 A1 | | 6/2011 | Hisatani et al. |
| 2011/0154589 A1 | | 6/2011 | Reindle |
| 2011/0180098 A1 | | 7/2011 | Lange et al. |
| 2011/0258804 A1 | | 10/2011 | Jaeger |
| 2012/0125367 A1 | | 5/2012 | Monkman et al. |
| 2012/0152877 A1 | | 6/2012 | Tadayon |

FOREIGN PATENT DOCUMENTS

| | | | | |
|---|---|---|---|---|
| DE | 3838299 | A1 | 5/1990 | |
| DE | 19847239 | A1 | 4/2000 | |
| DE | 19916820 | C1 | 10/2000 | |
| DE | 19918312 | C1 | 10/2000 | |
| DE | 10317479 | A1 | 11/2004 | |
| DE | 202005002558 | U1 | 5/2005 | |
| DE | 202006002109 | U1 | 5/2006 | |
| DE | 202006003697 | U1 | 6/2006 | |
| DE | 102009019168 | B3 | 10/2010 | |
| DE | 102010025845 | A1 | 1/2011 | |
| DE | 102010008131 | A1 | 2/2011 | |
| DE | 102010006531 | A1 | 8/2011 | |
| EP | 0505956 | A1 | 9/1992 | |
| EP | 0847720 | A2 | 6/1998 | |
| EP | 1818626 | A2 | 8/2007 | |
| EP | 2048455 | A2 | 4/2009 | |
| EP | 2366964 | A1 | 9/2011 | |
| EP | 2422889 | A1 * | 2/2012 | ............ B08B 1/008 |
| ES | 2346617 | A1 | 10/2010 | |
| GB | 2330297 | A | 4/1999 | |
| GB | 2472642 | A | 2/2011 | |
| JP | 53-136363 | | 11/1978 | |
| JP | 57-87562 | A | 6/1982 | |
| JP | 3-192775 | A | 8/1991 | |
| JP | 4-244342 | | 9/1992 | |
| JP | 7-171517 | | 7/1995 | |
| JP | 8-168450 | A | 7/1996 | |
| JP | 11-350684 | A | 12/1999 | |
| JP | 2002-273351 | A | 9/2002 | |
| JP | 2004-186632 | A | 7/2004 | |
| JP | 2006-116525 | | 5/2006 | |
| JP | 2010-186819 | A | 8/2010 | |
| JP | 2010-287867 | A | 12/2010 | |
| KR | 10-0949484 | B1 | 3/2010 | |
| KR | 10-2010-0091056 | | 8/2010 | |
| KR | 10-2012-0016372 | A | 2/2012 | |
| KR | 10-1193122 | | 10/2012 | |
| WO | 1992/018360 | A1 | 10/1992 | |
| WO | 1998/024353 | A1 | 6/1998 | |
| WO | 2004/091816 | A1 | 10/2004 | |

(56) References Cited

FOREIGN PATENT DOCUMENTS

| WO | 2004/098984 A1 | 11/2004 |
| WO | WO 2006/089307 A2 | 6/2006 |
| WO | 2009/061046 A1 | 5/2009 |
| WO | WO 2010/090493 A2 | 8/2010 |
| WO | 2011/004411 A2 | 1/2011 |
| WO | 2011/029416 A1 | 3/2011 |
| WO | 2011/128084 A2 | 10/2011 |
| WO | WO2012-025527 | 3/2012 |

OTHER PUBLICATIONS

Office Action dated Jan. 3, 2017 in Chinese Patent Application No. 201480005379.3 (with English-language Translation).
Office Action dated Dec. 19, 2017 in Japanese Patent Application No. 2015-553835 (with English-language Translation).

* cited by examiner

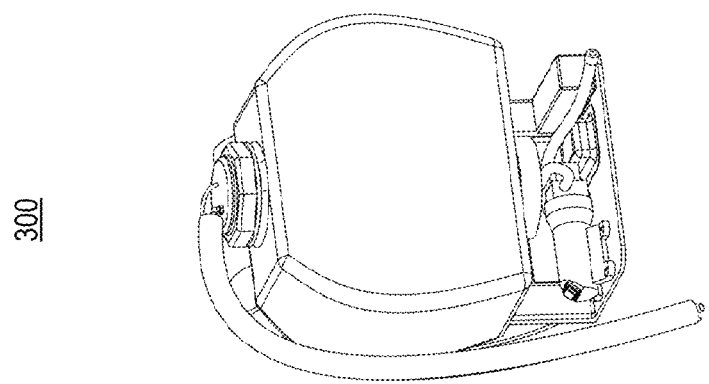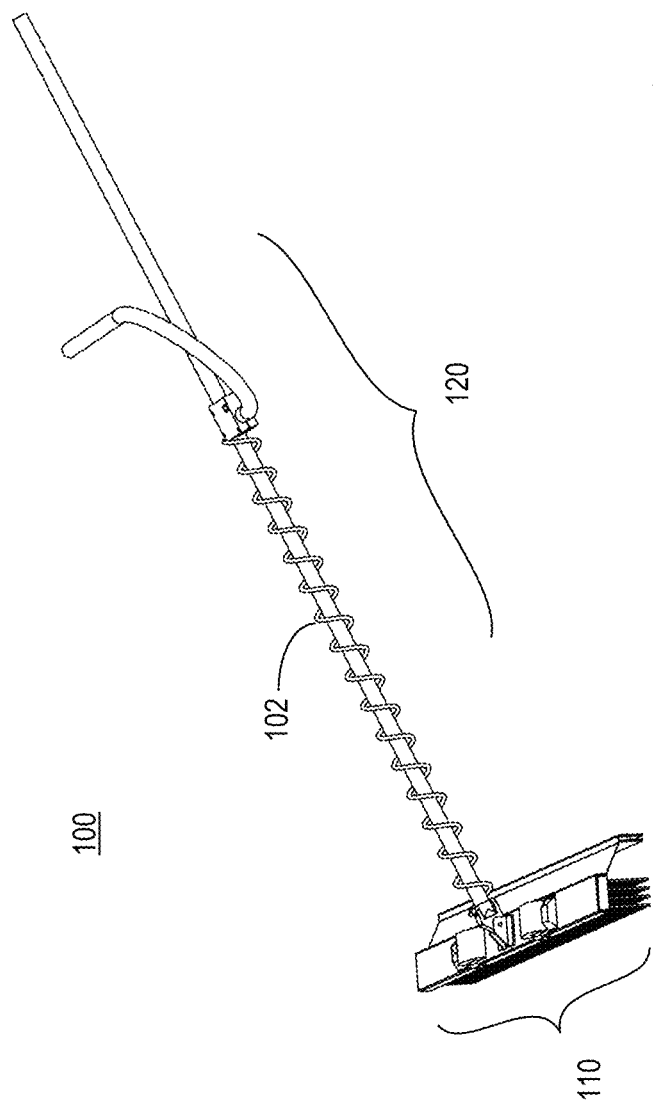
FIG. 1B

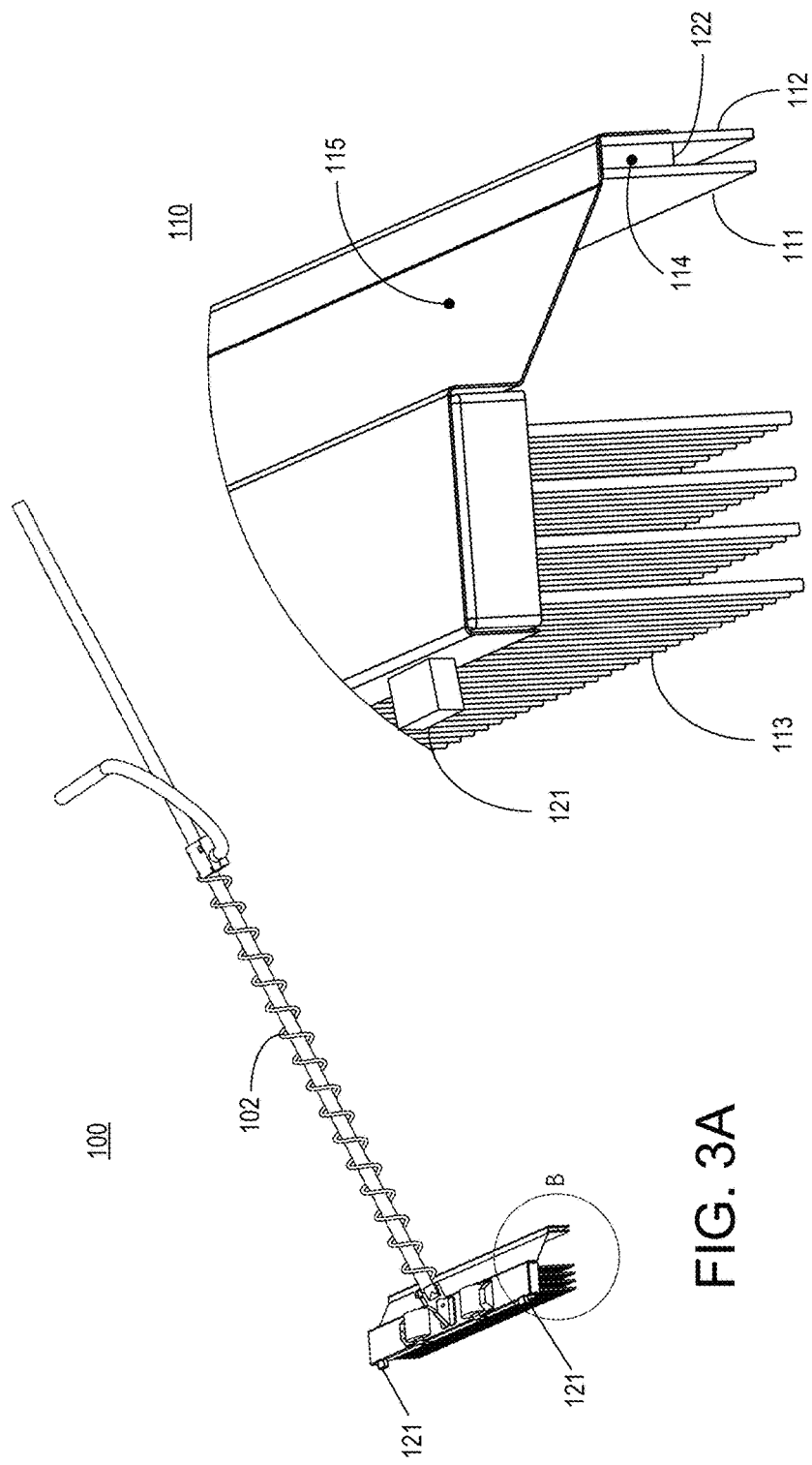

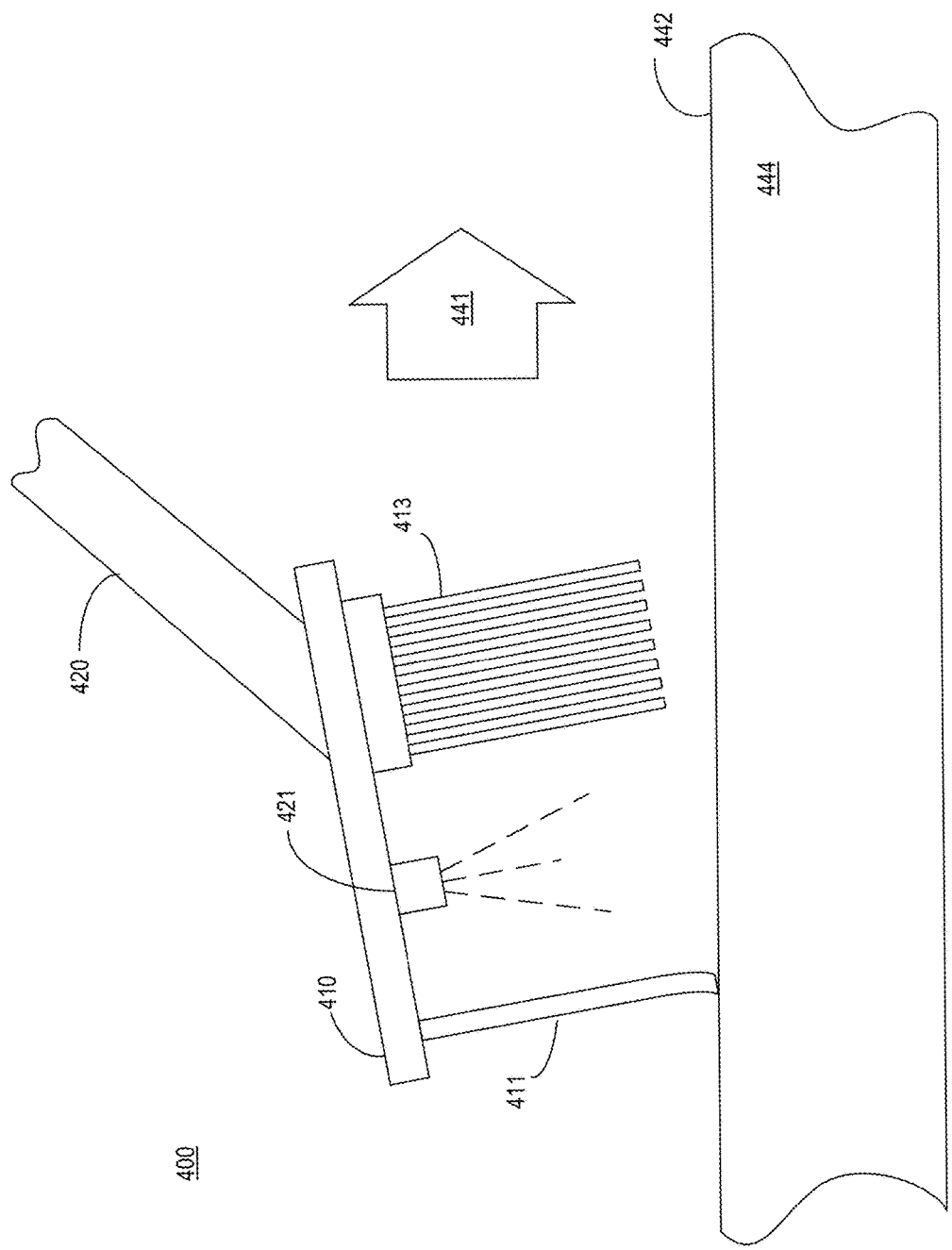

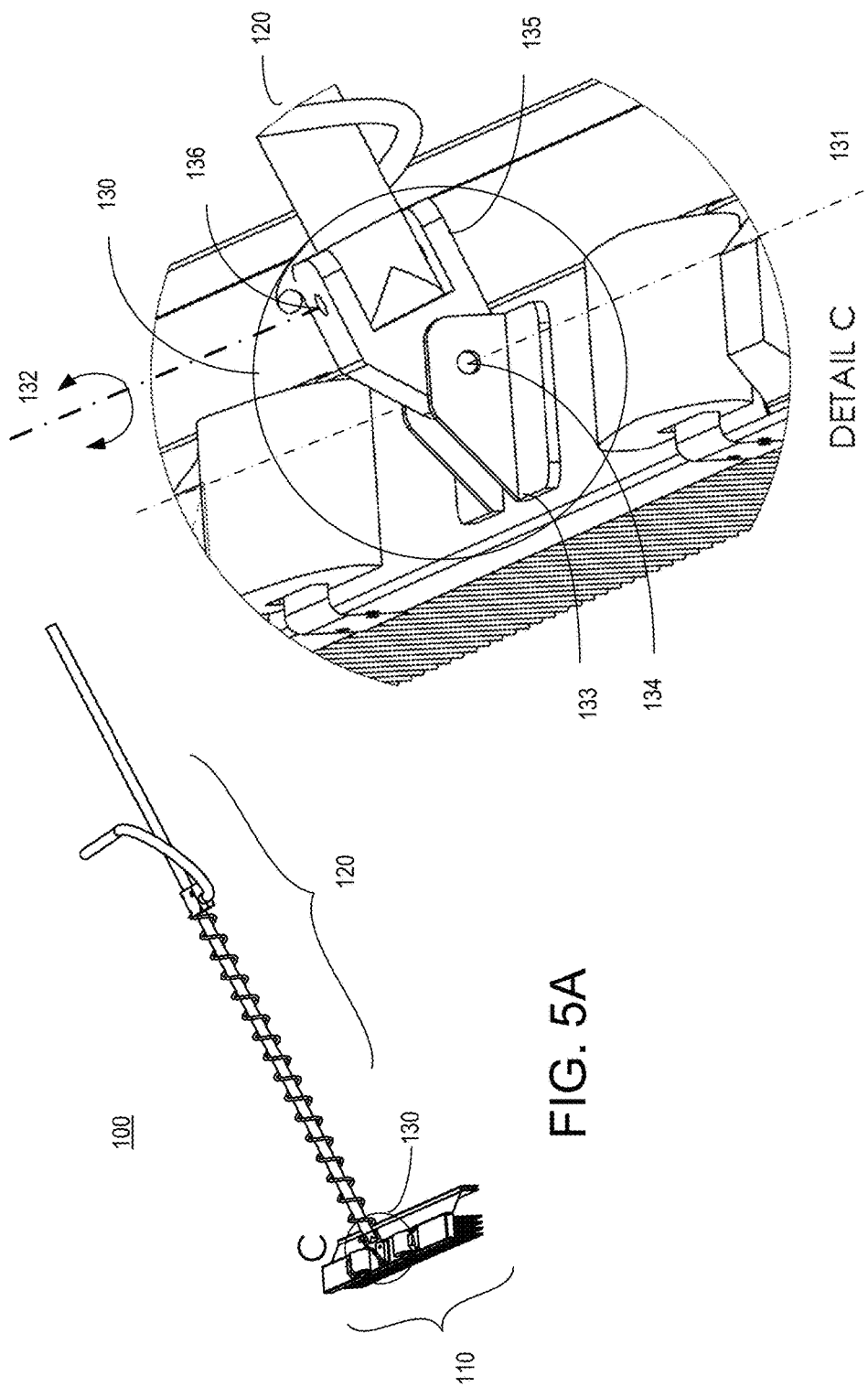

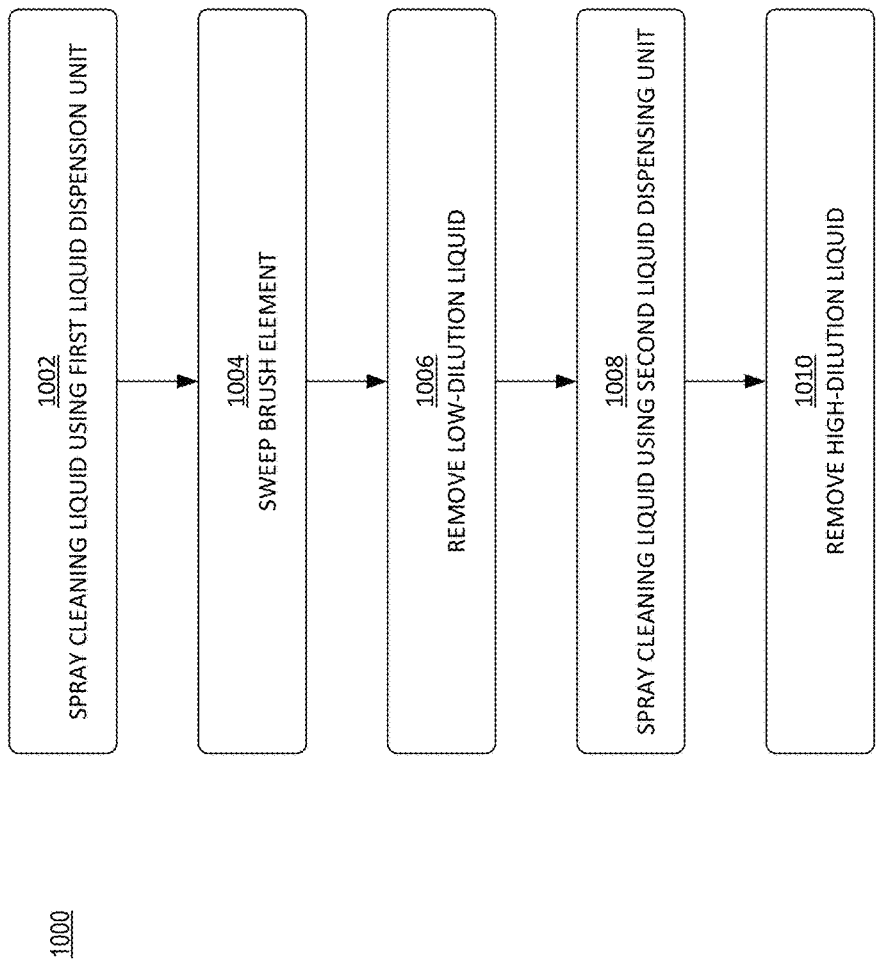

MECHANISM FOR CLEANING SOLAR COLLECTOR SURFACES

BACKGROUND

1. Field

The present disclosure relates generally to an apparatus and method for cleaning solar collectors and, more specifically, to a brush and squeegee mechanism for removing dust sediment from the collector surface of a solar collector.

2. Description of Related Art

Traditionally, fossil fuels, including coal, oil, and natural gas, have been used to supply electrical energy for residential and commercial purposes. Presently, fossil fuels are an abundant and relatively inexpensive source of energy. However, there are several known drawbacks associated with the use of fossil fuels. For example, fossil fuels are generally considered to be a nonrenewable source of energy and may become less abundantly available in the foreseeable future. Also, the burning of fossil fuels typically results in the production of carbon dioxide and other gas emissions that are potentially harmful to humans and the environment.

Harnessing light energy from the sun is one alternative to using fossil fuels as a source of energy. Using a solar collector, sunlight can be converted to other useful forms of energy. For example, one type of solar collector converts solar light energy into heat energy that can be used to supplement a residential hot water supply. Another type of solar collector uses a photovoltaic (PV) element to convert solar light energy directly into electrical energy. Yet another type of solar collector uses a reflective surface (e.g., polished mirror) to redirect solar light energy onto the surface of a boiler where the sunlight is converted into heat energy.

Typically, solar collectors are characterized by a large-area collector surface for receiving the solar light energy. The amount of energy that is available for conversion depends on the amount of light that is incident on the collector surface of the solar collector. For this reason, solar collectors are typically installed in sunny, dry areas to maximize the amount of light exposure. However, such areas are also prone to high winds and dusty conditions. Over time, dust and other airborne particulate can accumulate on the collector surface and block light that would otherwise be incident on the collector surface, thereby reducing the potential power output of the solar collector.

To maintain a consistent power output, the collector surface of a solar collector should be regularly cleaned to remove light-blocking debris. Traditionally, solar collectors have been cleaned by hand using techniques similar to those used to clean glass windows. However, traditional manual-cleaning techniques, including pressure washing and deluge cleaning, require a substantial supply of water and a significant amount of labor and power resources. For solar collectors that are installed on rooftops or in remote locations, frequent manual cleaning may not be practical.

Therefore, there is a need for systems and techniques for cleaning solar collectors that improve the utilization of labor and water resources. The systems described herein are directed to techniques that use a brush and squeegee mechanism to efficiently remove debris from the collector surface of a solar collector.

BRIEF SUMMARY

One exemplary embodiment is directed to a system for cleaning a collector surface of a solar collector. The system includes a first liquid-dispensing unit configured to deliver a first spray of liquid to the collector surface. The system also includes a brush element having a longitudinal side oriented along a first direction and disposed adjacent to the first liquid-dispensing unit. A first squeegee element is oriented along the first direction and adjacent to the brush element on a side opposite to the first liquid-dispensing unit. The first squeegee element, the brush element, and the first liquid-dispensing unit define a first cleaning area on the collector surface. A second squeegee element is oriented along the first direction and separated from the first squeegee element by a gap to define a second cleaning area. The system also includes a second liquid-dispensing unit configured to deliver a second spray of liquid to the second cleaning area located between the first and second squeegees.

Another exemplary embodiment is directed to a robotic cleaning device configured to clean a row of inclined solar collectors. The robotic cleaning device is configured to traverse across the row of inclined solar collectors and to cross gaps between adjacent solar collectors in the row. The robot includes a frame having a front and back end, wherein the back end is adapted to be disposed toward the top of the row of inclined solar collectors. The robotic cleaning device also includes a front continuous track mechanism disposed at the front end of the frame and a rear continuous track mechanism disposed at the rear end of the frame. The front and rear continuous track mechanisms are configured to convey the robot along top surfaces of the row of inclined solar collectors, and across gaps between adjacent solar collectors in the row.

The robotic cleaning device includes a first and second liquid-dispensing unit, a brush element, and a first and second squeegee element. The first liquid-dispensing unit is configured to deliver a first spray of cleaning liquid to the collector surface. The brush element has a longitudinal side oriented along a first direction and disposed adjacent to the first liquid-dispensing unit. The first squeegee element is oriented along the first direction and adjacent to the brush element on a side opposite to the first liquid-dispensing unit, wherein the first squeegee element, the brush element, and the first liquid-dispensing unit define a first cleaning area on the collector surface. The second squeegee element is oriented along the first direction and separated from the first squeegee element by a gap to define a second cleaning area on the collector surface. The second liquid-dispensing unit is configured to deliver a second spray of cleaning liquid to the second cleaning area.

Another exemplary embodiment is directed to a system for cleaning a collector surface of a solar collector using a single squeegee. The system includes a cleaning head and a handle for positioning the cleaning head on the collector surface of the solar collector. The cleaning head comprises a squeegee element, a brush element, and a liquid-dispensing unit. The squeegee element has a longitudinal side oriented along a first direction, the squeegee element. The brush element is oriented along the first direction and separated from the squeegee element by a gap. The liquid-dispensing unit is configured to deliver a spray of liquid to an area in the gap between the squeegee element and the brush element. The cleaning head is configured to place both the squeegee element and the brush element in contact with the collector surface when the cleaning head is in a first orientation. The cleaning head is also configured to place the brush element in contact with the collector surface and lift the squeegee element from the collector surface when the cleaning head is in a second orientation. The cleaning head is also configured to place the squeegee element in contact with the collector surface and lift the brush element from the collector surface when the cleaning head is in a third orientation.

DESCRIPTION OF THE FIGURES

FIGS. 1A and 1B depict an exemplary system for cleaning the collector surface of a solar collector.

FIGS. 3A and 3B depict an exemplary configuration of a cleaning head.

FIGS. 4A-C depict a schematic diagram of a cleaning head.

FIGS. 5A and 5B depict an exemplary coupling joint between the cleaning head and the handle element.

FIGS. 11A-C depict flowcharts for exemplary processes for cleaning the collector surface of a solar collector.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

As explained above, dust and other airborne particulate can accumulate on the collector surface of a solar collector and block light that would otherwise be incident on the collector surface. Accumulated particulates and other debris tend to reduce the amount of solar energy available for conversion and thereby reduce the potential power output of the solar collector. For example, a photovoltaic collector in a dusty environment may lose between 0.1 to 0.3 percent of its power-generation capacity per day due to the accumulation of light-blocking debris on the collector surface. If the collector is not cleaned during an entire dry season, an accumulated loss of 20 percent is possible. Therefore, in at least some cases, regular cleaning of the collector surface of a solar collector can prevent degradation in the optical interface between the solar collector and the sun and help maximize the overall power production of the solar collector.

The systems and methods described below are relevant to the cleaning of the collector surface of a variety of solar collectors. Exemplary solar collectors include photovoltaic collectors, solar thermal collectors, solar-light reflector collectors, and the like. Solar collectors may also be referred to as solar panels, particularly when the energy conversion occurs within the body of the solar panel. In the examples provided below, the collector surface is flat. However, in other implementations, the collector surface may be curved or parabolic in shape.

3. Hand-Held Cleaning Device Using a Double Squeegee

Figure 1A:
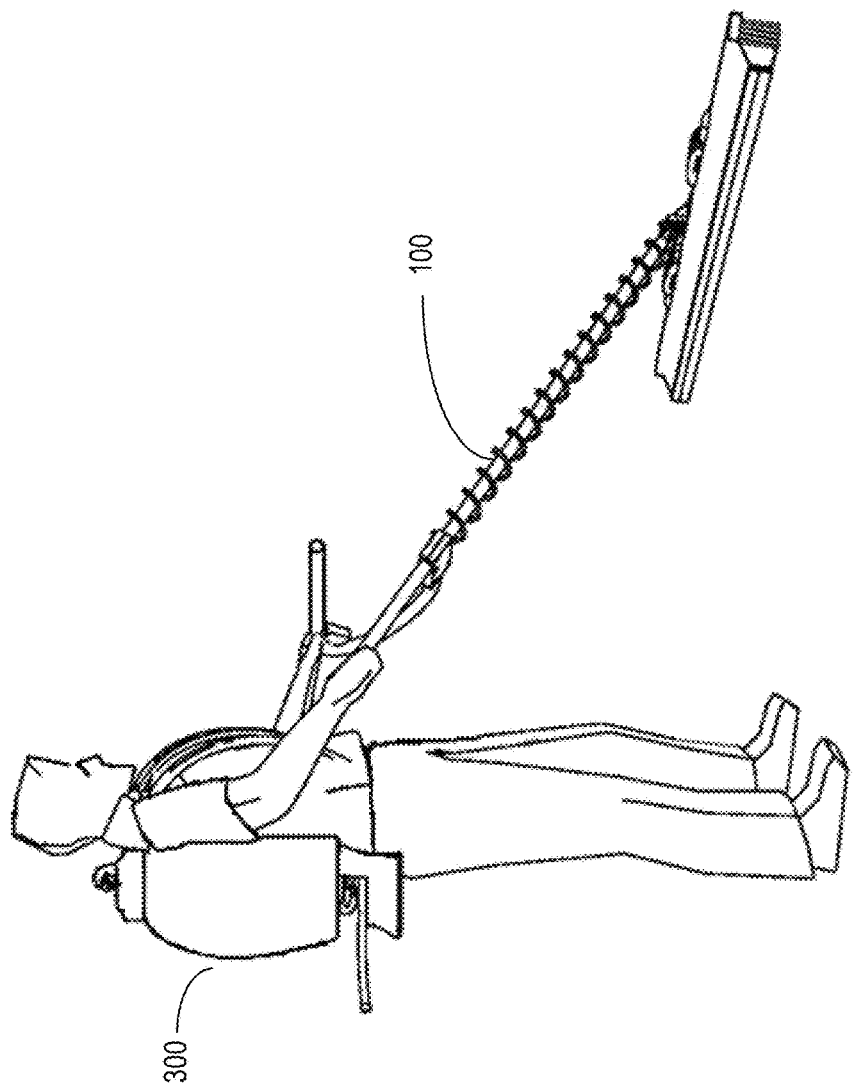

FIGS. 1A and 1B depict components of an exemplary system for cleaning the collector surface of a solar collector using a double squeegee. The system depicted in FIGS. 1A and 1B includes a hand-held cleaning device 100 and a backpack liquid supply unit 300. As shown in FIG. 1B, the hand-held cleaning device 100 includes a cleaning head 110 for cleaning the collector surface and a handle element 120 configured to be hand-held by a human operator. The backpack liquid supply unit 300, depicted in FIGS. 1A and 1B, is configured to be worn by a human operator and is also configured to supply cleaning liquid to the cleaning head 110 via at least one liquid supply hose 102. In the present embodiment, a hand-operated control valve can be actuated by the operator to deliver a flow of cleaning liquid to the cleaning head 110.

In the system depicted in FIGS. 1A and 1B, the hand-held cleaning device 100 is configured for cleaning a solar collector mounted on an installation surface that is accessible to a human operator (e.g., a ground surface or rooftop surface able to support a human operator). It is assumed that the solar collector is installed in a location that allows an operator to stand adjacent to at least one side of the solar collector. In one example, an operator, wearing the backpack liquid supply unit 300, cleans the collector surface of the solar collector by placing the cleaning head 110 on the collector surface, actuating the hand-operated control valve, and moving the cleaning head 100 across the collector surface by walking along one side of the solar collector. In another example involving multiple solar collectors arranged in a row, the operator cleans the entire row by walking along the side of the row of solar collectors. In some cases, if a gap between the panels is too large, the operator uses the handle element 120 to lift the cleaning head 110 when transitioning between adjacent solar collectors.

The hand-held cleaning device 100 depicted in FIGS. 1A and 1B is configured to clean an area of the collector surface of the solar collector in a single pass. That is, the hand-held cleaning device is only passed over a given area once to perform the cleaning operation. Contrast this with a mechanism or technique that requires multiple passes to perform the cleaning and drying of the collector surface.

Typically, a cleaning operation using the hand-held cleaning device 100 results in a reduced amount of cleaning liquid and manual labor, compared to some traditional cleaning techniques. For example, the hand-held cleaning device 100 can be configured to clean a typical roof-mounted, photovoltaic solar collector using as little as 0.05 L/m$^2$ of cleaning liquid at a cleaning rate of approximately 300 m$^2$/hour. In comparison, a traditional spray-cleaning technique may use as much as 1.0 L/m$^2$ of cleaning liquid at a cleaning rate that may be substantially slower than 300 m$^2$/hour.

Figure 2:
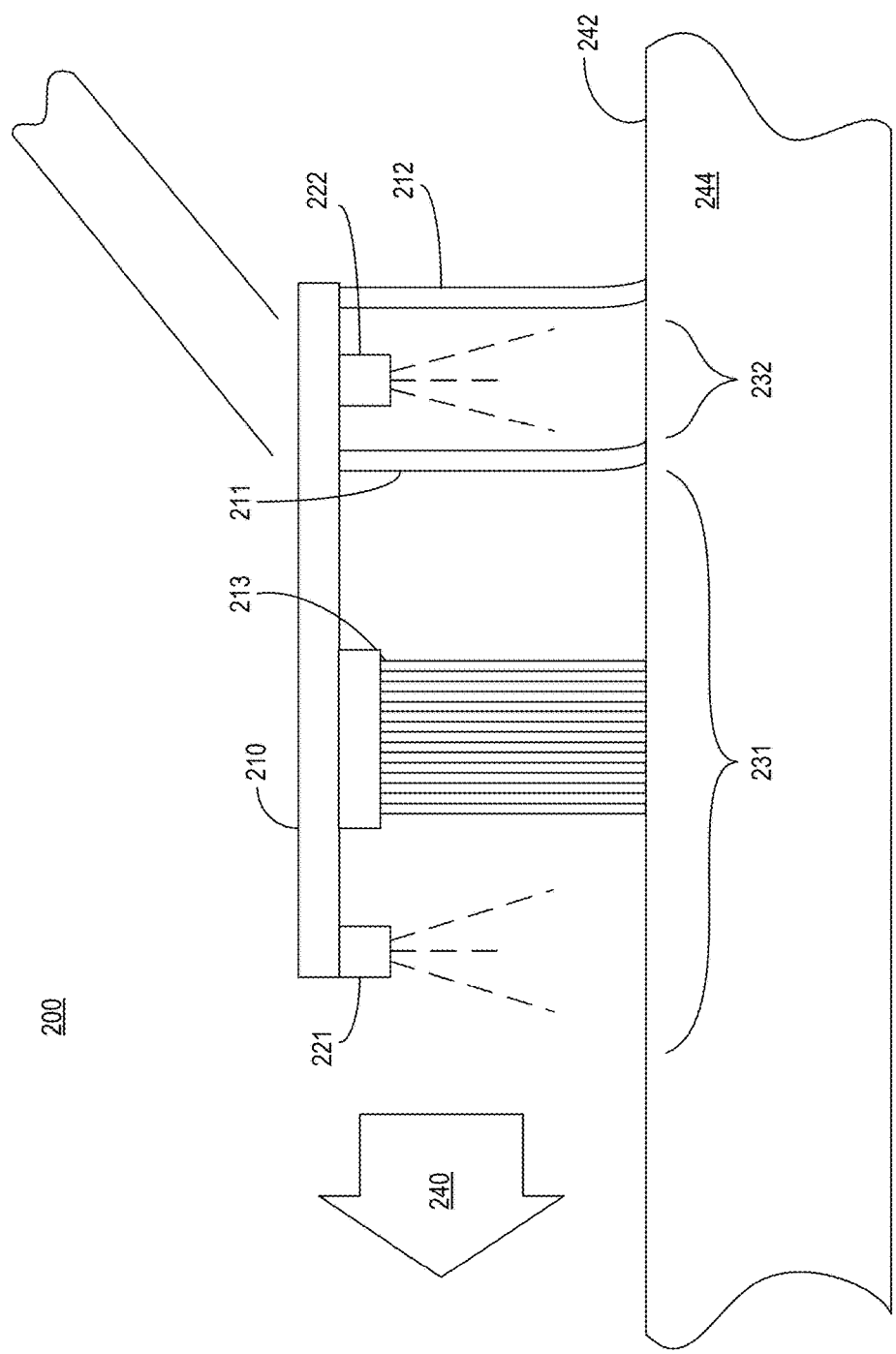
FIG. 2 depicts a schematic diagram of a cleaning head.

FIG. 2 depicts a schematic diagram of a cleaning head that can be used to clean a solar collector in a single pass and use a reduced amount of cleaning liquid as compared to some traditional cleaning techniques. FIG. 2 depicts a portion of a hand-held cleaning device 200, including a cleaning head 210. As shown in FIG. 2, cleaning head 210 includes a brush element 213, a first squeegee element 211, and a second squeegee element 212. A cleaning liquid is applied to the collector surface 242 of the solar collector 244 using first and second liquid-dispensing units 221, 222.

In this example, as the cleaning head 210 is moved across the collector surface 242 in a sweep direction 240, two cleaning areas are created: a low-dilution area 231 and a high-dilution area 232. As shown in FIG. 2, the low-dilution area 231 precedes the high-dilution area 232 as the cleaning head 210 is moved in the sweep direction 240. Also, as the cleaning head 210 is swept, the first squeegee element 211 acts as a liquid barrier and separates the low-dilution area 231 from the high-dilution area 232.

As shown in FIG. 2, the low-dilution area 231 corresponds to a portion of the collector surface 242 near the first liquid-dispensing unit 221, a portion of the collector surface 242 under the brush element 213, and extends toward the first squeegee element 211. In a typical implementation, the first liquid-dispensing unit 221 delivers a first spray to a dry area of the collector surface 242. After being wetted by the first liquid-dispensing unit 221, the brush element 213 is used to dislodge particulate material and other debris that has accumulated on the collector surface 242 of the solar collector 244. As a result, the liquid present in the low-dilution area 231 typically contains a relatively high concentration of particulate material suspended in a volume of cleaning liquid. As the cleaning head 210 is moved across the collector surface 242, nearly all of the cleaning liquid and suspended particulate material are removed by the first squeegee element 211.

As shown in FIG. 2, the high-dilution area 232 is located on a side of the first squeegee element 211 opposite to the low-dilution area 231 and includes the area between the first squeegee element 211 and the second squeegee element 212. In a typical implementation, the high-dilution area 232 corresponds to the portion of the collector surface 242 that is being wetted by the cleaning liquid a second time. Accordingly, the cleaning liquid present in the high-dilution area 232 typically contains a lower concentration of particulate suspended in a volume of cleaning liquid as compared to the concentration of suspended particulate in the low-dilution area 231. As the cleaning head 210 is moved across the collector surface 242, nearly all of the liquid and suspended particulate material are removed by the second squeegee element 212.

If the solar collector 244 is installed on an incline, the liquid and suspended particulate material removed by the second squeegee element 212 may drain from the high-dilution area 232 by gravity. In some embodiments, the removed liquid may be collected and re-routed back to the first liquid-dispensing unit 221. An example of a re-routing configuration is discussed with respect to the liquid-routing scheme depicted in FIG. 7B and the process 1100 of FIG. 11B.

FIGS. 3A and 3B depict an exemplary configuration of a cleaning head that can be used to clean a solar collector in a single pass. As shown in FIG. 3B, cleaning head 110 includes a brush element 113, a first squeegee element 111, a second squeegee element 112. The first and second squeegee elements 111, 112 are separated by a spacer 114. The cleaning head 110 also includes backing plate 115 for mounting the other components of the cleaning head.

A first and second liquid-dispensing unit 121, 122 are configured to deliver a first and second spray of cleaning liquid onto the collector surface of a solar collector. As discussed above with respect to FIG. 2, the first and second liquid-dispensing units 121, 122 (in conjunction with the other cleaning head components) are configured to produce two cleaning areas separated by the first squeegee element 111: a low-dilution area and a high-dilution area.

As shown in FIG. 3B, the first liquid-dispensing unit 121 is located adjacent to the brush element 113 and opposite to the first and second squeegee elements 111, 112. In this example, the first dispensing unit is in fluidic connection to the backpack liquid supply unit 300 via liquid supply hose 102, shown in FIG. 1B. The first liquid-dispensing unit 121 includes a nozzle for producing a spray of cleaning liquid onto the surface of a solar collector. The nozzle may include one or more orifices or other features for directing the spray of cleaning liquid. In some embodiments, the first liquid-dispensing unit 121 may also include one or more manifolds or drip rails configured to deliver a spray of cleaning liquid to the collector surface of the solar collector.

In FIG. 3B, the first liquid-dispensing unit 121 is depicted as being mounted toward one end of the cleaning head 110. In this embodiment, another liquid-dispensing unit is similarly positioned at the other end of the cleaning head 110. In other embodiments, a single liquid-dispensing unit may be positioned near the center of the cleaning head or, alternatively, more than two liquid-dispensing units are arranged along the length of the cleaning head roughly parallel to the brush element 113.

The cleaning head 110 also includes a second liquid-dispensing unit 122 located between the first and second squeegee elements 111, 112. In this example, the second liquid-dispensing unit 122 is in fluidic connection to the backpack liquid supply unit 300 via liquid supply hose 102, shown in FIG. 1B. In the present example, the first and second liquid-dispensing units 121, 122 share the same supply hose 102 and liquid source. However, in other embodiments discussed in more detail below with respect to FIG. 7B, alternative fluidic configurations may re-route water delivered by one liquid-dispensing unit for re-use by other liquid-dispensing units.

The second liquid-dispensing unit 122 depicted in FIG. 3B is formed as part of spacer 114. To form the second liquid-dispensing unit 122, a central channel or manifold is provided along a portion of the length of the spacer 114. Multiple vertical channels or holes are also provided, extending from the central channel or manifold and into the space between the first and second squeegee elements 111, 112. The vertical channels or holes are configured to deliver a spray of cleaning liquid to the area between the first and second squeegee elements 111, 112.

In the example depicted in FIG. 3B, the brush element 113 is made from several rows of straight bristles approximately 0.1-0.8 mm in diameter and approximately 50 mm in length. The bristles are made from a nylon or polypropylene polymer and are chemically resistant. In the present embodiment, the bristles are flexible. Typically, the bristles deform slightly when pressure is applied by the operator using the handle element 120 (shown in FIG. 1B). A slight deformation in the bristles is beneficial in obtaining sufficient contact between the brush element 113 and the collector surface of the solar collector. Other suitable brush materials include, for example, closed-cell neoprene foam, open-cell foam, and cloth materials.

First and second squeegee elements 111, 112 are made from strips of silicone rubber approximately 25 mm wide and 3 mm thick. In the present embodiment, the squeegees are flexible. Typically, the squeegees deform slightly when pressure is applied by the operator using the handle element 120 (shown in FIG. 1B). The silicone rubber in this example has a tensile strength of at least 5 MPa. Using a material with a tensile strength of greater than 5 MPa will typically improve the life span and wear resistance of the squeegee. In some cases, using a silicone rubber of at least 5 MPa may be beneficial for resisting tears and prolonging the service life of the cleaning head 110. Other suitable materials for the first and second squeegee elements 111, 112 may include EPDM, natural or synthetic rubbers, and other flexible materials.

In this example, the first and second squeegee elements 111, 112 are made from the same material and are the same thickness. In alternative embodiments, two squeegee elements could be made from materials having different thicknesses and different durometers. Also, in alternative embodiments, the first and second squeegee may be contoured or profiled to match the profile shape of the surface to be cleaned.

4. Hand-Held Cleaning Device Using a Single Squeegee

Figure 4A:
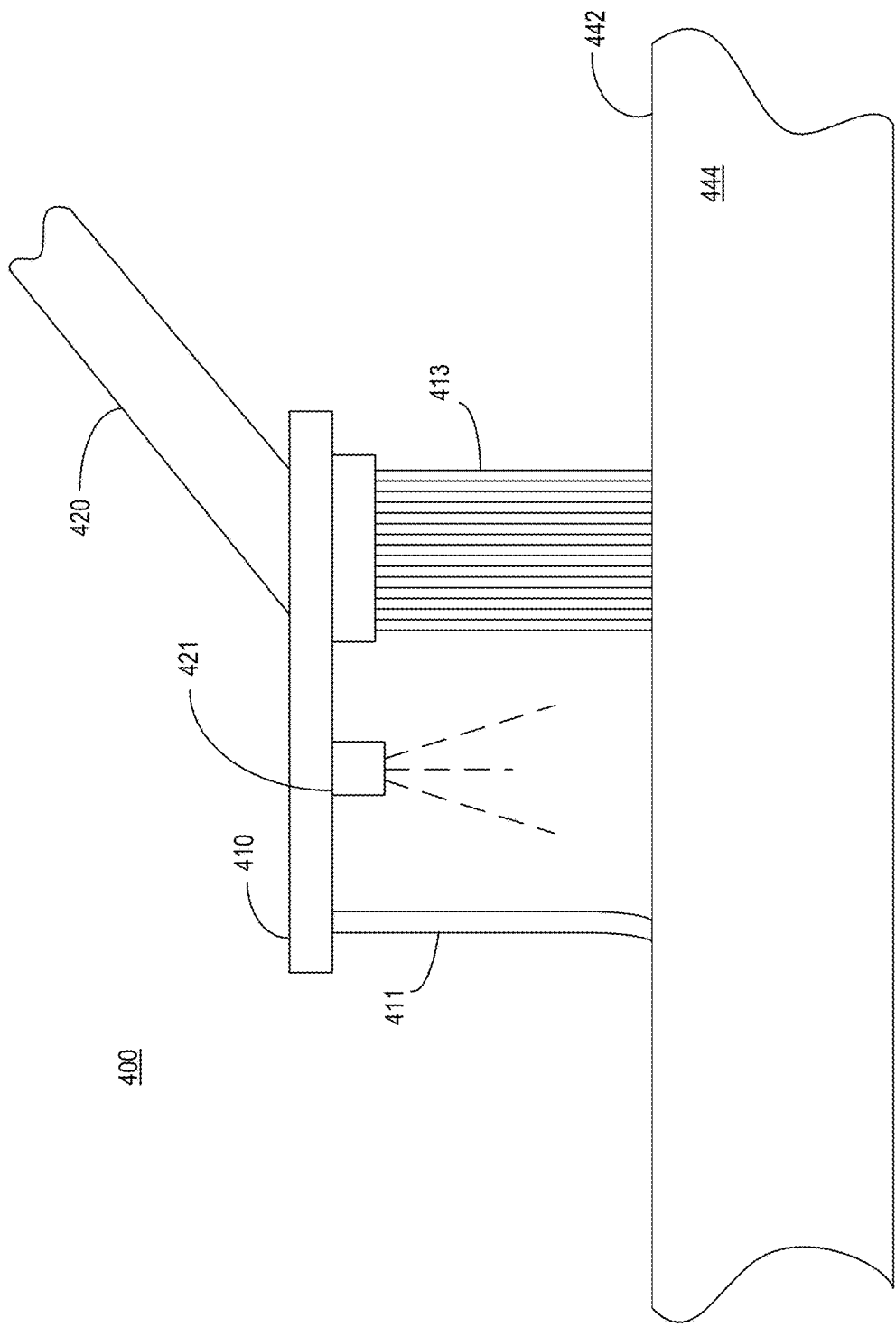
Figure 4B:
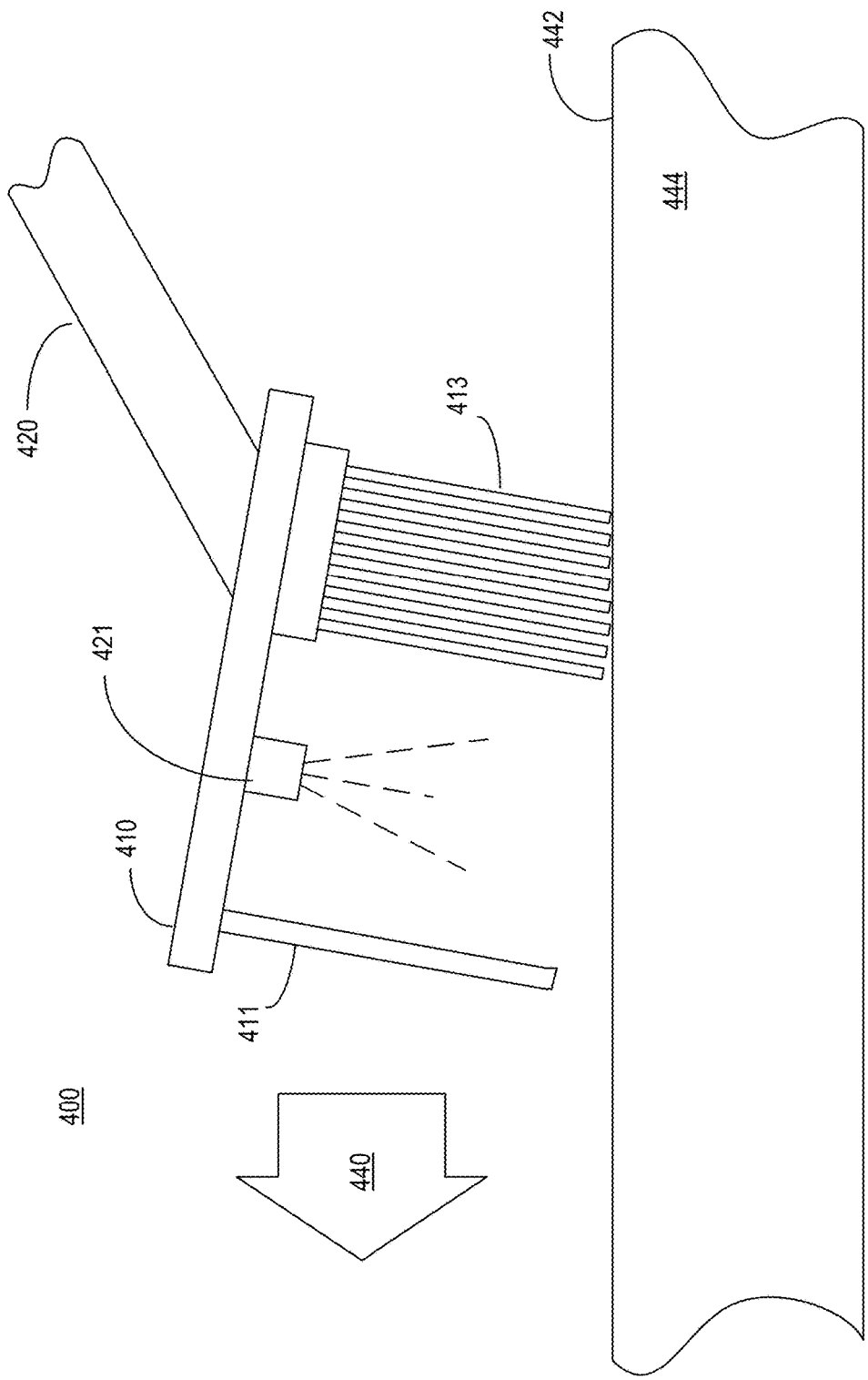

FIGS. 4A-C depict a single squeegee embodiment for cleaning the collector surface of a solar collector. As shown in FIGS. 4A-C, the hand-held cleaning device 400 includes a cleaning head 410 for dispensing a cleaning liquid and cleaning the collector surface of a solar collector. The cleaning head 410 is attached to a handle element 420 configured to be hand-held by a human operator. In the present embodiment, the cleaning head 410 is attached to the handle element 420 via a joint that allows the operator to tilt the cleaning head 410 by lifting or lowering the handle element 420. For example, the joint may be rigid, at least along an axis parallel to a longitudinal side of the cleaning head 410. As depicted in FIGS. 4A-C, the longitudinal side of the cleaning head 410 is substantially orthogonal to the sweep direction (440 in FIGS. 4B and 441 in FIG. 4C) of the cleaning head 410.

The cleaning head 410 includes a squeegee element 411, a brush element 413, and a liquid-dispensing unit 421. The squeegee element 411 has a longitudinal side that is oriented along a first direction, substantially parallel to the longitudinal side of the cleaning head 410. As depicted in FIG. 4A, the first direction is substantially orthogonal to the sweep direction (440, 441) of the cleaning head 410. The squeegee element 411 is made from a strip of a silicone rubber approximately 25 mm wide and 3 mm thick. As described with respect to other squeegee elements, other suitable materials for the squeegee element 411 include EPDM, natural or synthetic rubbers, and other flexible materials.

The brush element 413 is also oriented along the first direction and is separated from the squeegee by a gap. In this example, the brush element 413 is made from several rows of nylon or polypropylene bristles. Other suitable brush materials include, for example, closed-cell neoprene foam, open-cell foam, and cloth materials.

The liquid-dispensing unit 421 is located in the gap between the squeegee element 411 and the brush element 413. In the present embodiment, the liquid-dispensing unit includes one or more spray nozzles directed toward a portion of the collector surface 442 between the squeegee element 411 and the brush element 413. In other embodiments, the liquid-dispensing unit 421 may include one or more manifolds or drip rails for dispensing a spray of cleaning liquid.

The hand-held cleaning device 400 depicted in FIGS. 4A-C is configured to clean the collector surface of a solar collector in more than one pass. In particular, in the present embodiment the cleaning head is configured to deliver a first spray and brush a portion of the collector surface on a first pass. The cleaning head is also configured to deliver a second spray and squeegee the portion of the collector surface on a second pass. In the present embodiment, the orientation of the cleaning head 410 is rotated between the first and second passes.

FIGS. 4A-C depict three general orientations of the cleaning head 410. FIG. 4A depicts a first orientation for the cleaning head 410. In the first orientation, the cleaning head 410 places both the squeegee element 411 and the brush element 413 in contact with the collector surface 442 of the solar collector 444. The cleaning head 410 may be placed in the first orientation when, for example, the cleaning head 410 is first placed on the collector surface 442.

FIG. 4B depicts the cleaning head 410 in a second orientation. In the second orientation, the cleaning head 410 places the brush element 413 in contact with the collector surface 442 and lifts the squeegee element 411 from the collector surface 442 so that there is a gap between the collector surface 442 and the squeegee element 411. The cleaning head 410 may be placed in the second orientation if, for example, the operator pushes down on the handle element 420 as the handle element 420 is shown in FIG. 4B.

As shown in FIG. 4B, the cleaning head 410 may be placed in the second orientation when it is being swept across the collector surface 442 in first direction 440. In the present embodiment, the liquid-dispensing unit 421 may deliver a first spray of cleaning liquid to the collector surface 442, while the cleaning head 410 is placed in the second orientation and being swept in the first direction 440. In the second orientation, the cleaning head 410 is positioned so that the brush element 413 can agitate and dislodge particulate material and other debris that has accumulated on the collector surface 442 of the solar collector 444.

FIG. 4C depicts the cleaning head 410 in a third orientation. In the third orientation, the cleaning head 410 places the squeegee element 411 in contact with the collector surface 442 and lifts the brush element 413 from the collector surface 442 so that there is a gap between the collector surface 442 and the brush element 413. The cleaning head 410 may be placed in the third orientation if, for example, the operator lifts up on the handle element 420 as shown in FIG. 4C.

As shown in FIG. 4C, the cleaning head 410 may be placed in the third orientation when it is being swept across the collector surface 442 in a second direction 441 (opposite to the first direction 440). In the present embodiment, the liquid-dispensing unit 421 may deliver a second spray of cleaning liquid to the collector surface 442, while the cleaning head 410 is placed in the third orientation and being swept in the second direction 441. In the third orientation, the cleaning head 410 is positioned so that the squeegee element 411 can wipe the collector surface 442 to scrape remaining accumulated particulate and remove the cleaning liquid.

An exemplary process 1200 for cleaning a collector surface 442 using the cleaning head 410 is described in more detail below with respect to FIG. 11C.

5. Coupling Joint Element

In general, it may be advantageous that a cleaning head be applied to the collector surface at a particular orientation. With respect to the single-squeegee example depicted in, for example, FIGS. 4A-C, the orientation of the cleaning head should be fixed with respect to the handle element, at least along a longitudinal side of the cleaning head. With respect to the dual-squeegee cleaning head described in, for example, FIG. 2, the orientation of the cleaning head should be maintained so that the brush and first and second squeegees are in contact with the collector surface while the cleaning operation is being performed. In some dual-squeegee embodiments, the brush element may be stiffer than the two squeegee elements and tend to lift the leading edge of the cleaning head as it is moved across the collector surface. Alternatively, the second squeegee element may be stiffer than the brush element and tend to lift the trailing edge of the cleaning head as it is moved. In either of these scenarios, a moment must be applied to the cleaning head to ensure that all three elements (the brush element, the first squeegee element, the second squeegee element) remain in contact with the collector surface.

FIGS. 5A and 5B depict an exemplary coupling joint between the cleaning head and the handle element that assists in maintaining the orientation of the cleaning head with respect to the collector surface. As shown in FIGS. 5A and B, the handle element 120 is attached to the cleaning head 110 using coupling joint 130, which helps maintain the orientation of the cleaning head by preventing rotation of the cleaning head along a first axis 131. The first axis 131 is roughly parallel to the longitudinal side of the brush element 113 and squeegee elements 111, 112.

As shown in FIG. 5B, the coupling joint 130 includes a first clevis 133, first clevis pin 134, and second clevis 135 that are fixed with respect to the coupling joint 130. As a result, the coupling joint 130 prevents rotation about the first axis 131. The first clevis pin 134 may be press-fit or welded to both the first clevis 133 and the mating portion of the second clevis 135. In some embodiments, a single, solid element is used in place of the first clevis 133, the first clevis pin 134, and the mating portion of the second clevis 135.

Because the coupling joint prevents rotation about the first axis 131, a moment can be applied to the cleaning head 110 using the handle element 120. For example, the operator can apply an upward or downward force using the handle element 120 to exert a moment force on the cleaning head 110. As mentioned above, a moment force may be necessary to maintain the orientation of the cleaning head 110, depending on the stiffness of the brush element 113 with respect to the first and second squeegee elements 111, 112 in the cleaning head.

As shown in FIG. 5B, the coupling joint 130 also includes a second clevis 135 and second clevis pin 136 that allow the handle element 120 to rotate around a second axis 132. The second axis 132 is typically orthogonal to the first axis 131. Coupling joint rotation about the second axis 132 allows the handle element 120 to move side-to-side with respect to the cleaning head 110. In this way, the coupling joint 130 allows the operator to move closer or further away from the cleaning head 110 while it is positioned on the collector surface of a solar collector. It also allows the cleaning head 110 to remain flat on the solar collector along the longitudinal side of the cleaning head 110.

In this example depicted in FIG. 5B, the second clevis 135 includes a pair of holes that are a clearance fit for the second clevis pin 136, which is fixed to the handle element 120. In an alternative configuration, the second clevis pin 136 could be fixed to the second clevis 135 and freely rotate within a hole in the handle element 120.

6. Backpack Liquid Supply Unit

Figure 6:
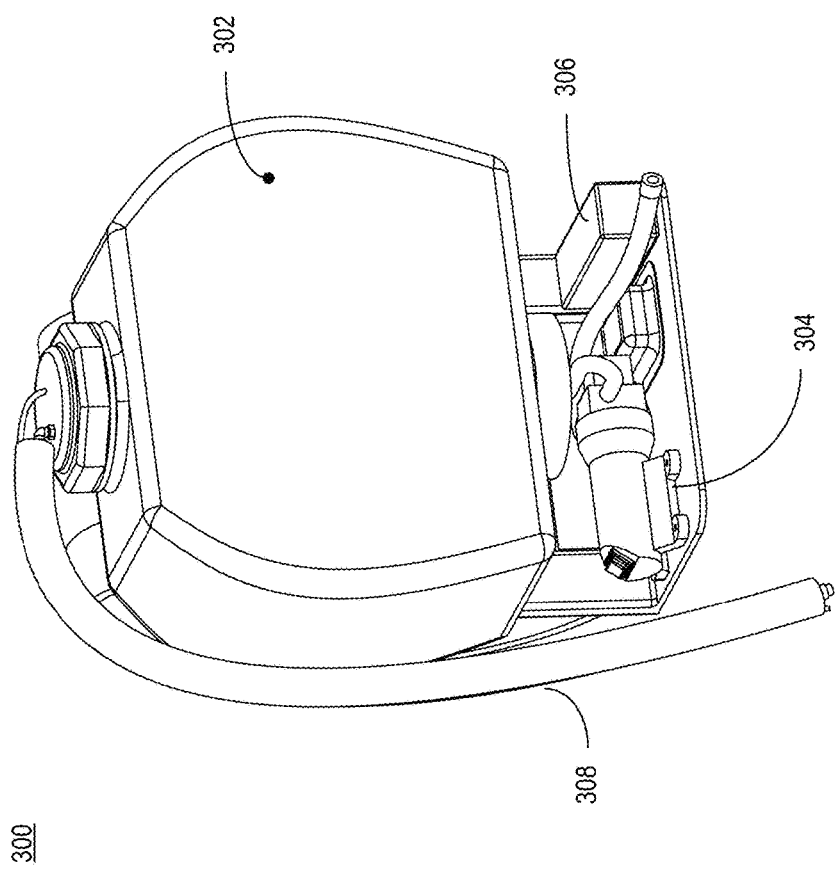
FIG. 6 depicts an exemplary backpack liquid supply unit.

As discussed above with respect to FIGS. 1A and 1B, the hand-held cleaning device 100 may be held by an operator wearing a backpack liquid supply unit 300. The backpack liquid supply unit 300 can also be used to provide cleaning liquid to the single-squeegee hand-held cleaning device 400 depicted in FIGS. 4A-C. FIG. 6 depicts an exemplary backpack liquid supply unit 300 and associated components for supplying a cleaning liquid to the hand-held cleaning device 100.

As shown in FIG. 6, the backpack liquid supply unit 300 includes, inter alia, a liquid reservoir element 302, a pump element 304, and a power supply 306. The components of the backpack liquid supply unit 300 are mechanically integrated into a wearable harness configured to be worn as a backpack by the operator. In this example, the backpack liquid supply unit 300 includes a metal frame for mounting the components and two shoulder straps for attaching the unit to the back of the operator.

In this example, the liquid reservoir element 302 is a clear plastic container having the capacity to hold approximately 15 liters of cleaning liquid. The liquid reservoir element 302 may be formed using a blow molding or similar plastic forming process. The liquid reservoir element 302 includes one or more output tubes for supplying the cleaning liquid to the first and second liquid-dispensing units 111, 112 on the cleaning head 110. In the present embodiment, the output tube of the backpack liquid supply unit 300 is connected to the liquid supply hose 102 attached to the handle element 120. The connection between the output tube of the backpack liquid supply unit 300 and the liquid supply hose 102 is typically provided by a quick-disconnect type fluidic coupling that allows the backpack liquid supply unit 300 to be easily separated from the hand-held cleaning device 100.

The liquid reservoir element 302 also includes a vented supply hose 308 for refilling the liquid reservoir element 302, which is also fitted with a quick-disconnect type fluidic coupling. To facilitate refilling, the vented supply hose 308 can be directly connected to a feed hose of an external supply tank. Cleaning liquid may be delivered from the external supply tank using a gravity feed or other liquid delivery technique. The vented supply hose 308 allows air to escape from the liquid reservoir element 302 as it is being filled to facilitate rapid refilling.

The backpack liquid supply unit 300 also includes a pump element 304 for delivering the cleaning liquid contained in the liquid reservoir element 302 to the cleaning head. In this example, the input of the pump element 304 is in fluidic connection with the liquid reservoir element 302 and the output of the pump is in fluidic connection with the cleaning head. In the present configuration, the pump element 304 includes a diaphragm-type electric pump.

The pump element 304 is controlled by a DC-motor speed-controller circuit capable of modulating the amount of electrical power provided to the pump element 304. In the present example, the speed-controller circuit regulates the amount of cleaning liquid that is delivered to the cleaning head by controlling the rotational speed of the DC-motor of the pump element 304. In the present embodiment, the speed-controller circuit also includes an automatic, pressure-actuated shutoff control function. This functionality allows the speed-controller circuit to reduce or eliminate power to the pump when the hand-operated control valve is not actuated by the operator.

A power supply 306 provides electrical power to the pump element 304. In this example, the power supply 306 includes a rechargeable battery and a DC voltage regulating circuitry for providing DC electrical power used to drive the pump element 304. The power supply 306 is electrically connected to the pump element 304 via the DC-motor speed-controller circuit.

As depicted in FIG. 6, the pump element 304, power supply 306, and other components may be physically integrated into the backpack liquid supply unit 300. In an alternative embodiment, one or more of these components may be physically integrated with other components of the hand-held cleaning device. For example, the power supply and/or pump element may be physically mounted to the cleaning head. In some embodiments, an additional pump element and/or power supply are physically integrated with other components of the hand-held cleaning device.

In the present embodiment, the cleaning liquid is water. A mild detergent may also be added to the water to aid in cleaning the collector surface. In other embodiments, the cleaning liquid may include other cleaning agents, including acidic cleaning agents, alkaline cleaning agents, or other solvents.

7. Liquid Routing Systems

Figure 7A:
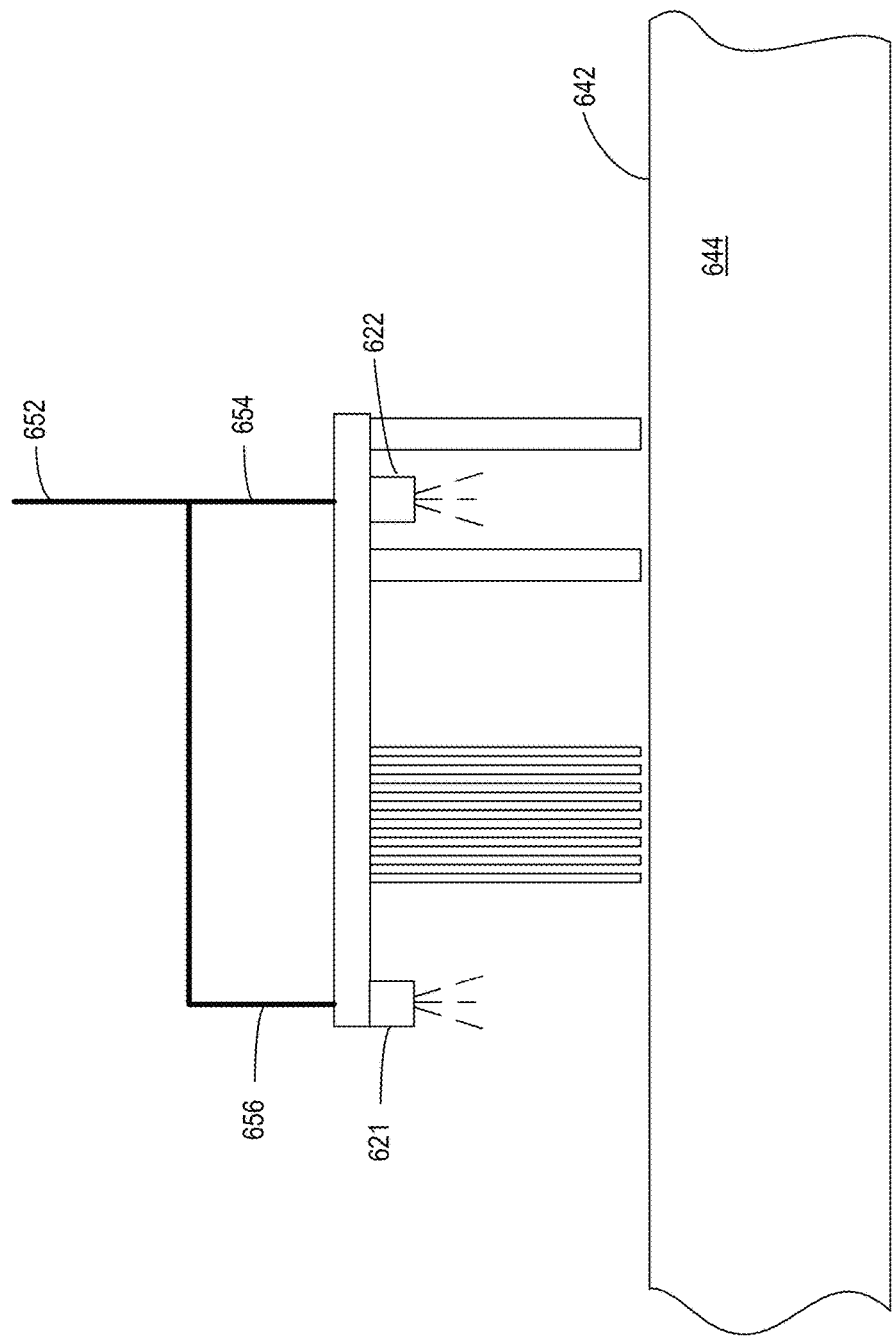
FIGS. 7A and 7B depict schematic diagrams of two exemplary liquid delivery systems for providing a flow of cleaning liquid to a cleaning head.
Figure 7B:
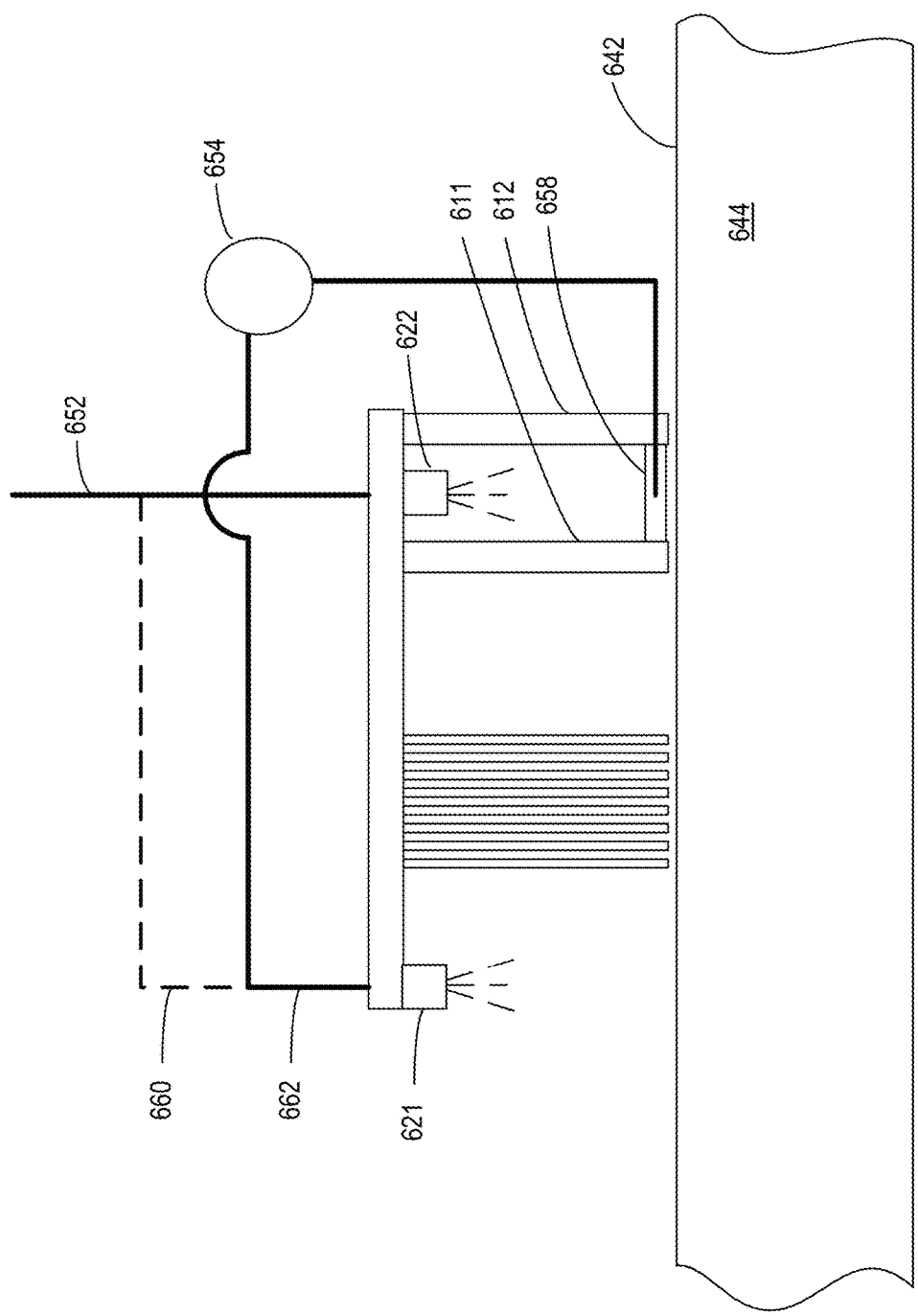

FIGS. 7A and 7B depict schematic diagrams of two exemplary liquid delivery systems for providing a flow of cleaning liquid to a dual-squeegee cleaning head. FIG. 7A depicts a liquid delivery system that provides fresh cleaning solution to both the first and second liquid-dispensing units. FIG. 7B depicts a liquid delivery system that collects liquid from the area between the first and second squeegees and recirculates the liquid to the first liquid-dispensing unit. The liquid delivery system in FIG. 7B provides an additional advantage of reducing the amount of cleaning liquid used to clean the collector surface 642 of a solar collector 644.

FIG. 7A depicts a schematic diagram of a first liquid delivery system that provides cleaning liquid to both the first and second liquid-dispensing units 621, 622. As shown in FIG. 7A, a main liquid supply line 652 provides a flow of cleaning liquid from a liquid source. The liquid source may be a liquid reservoir unit 302 of a backpack liquid supply unit 300, as discussed above with respect to FIG. 6. The main liquid supply line 652 may include at least one liquid supply hose 102, as discussed above with respect to FIG. 1B.

As shown in FIG. 7A, the flow from the main liquid supply line 652 is split into a first liquid supply line 656 and a second liquid supply line 654. The first liquid supply line 656 is used to provide a first flow of cleaning liquid to the first liquid-dispensing unit 621 and the second liquid supply line is used to provide a second flow of cleaning liquid to the second liquid-dispensing unit 622. The first liquid-dispensing unit 621 includes one or more nozzles or orifices for spraying the cleaning liquid on the collector surface 642 of the solar collector 644. Similarly, the second dispensing unit 622 includes one or more nozzles or orifices for spraying the cleaning liquid on the collector surface 642. Alternatively, either the first or second liquid-dispensing units 621, 622 could include one or more manifolds or drip rails for delivering the cleaning liquid to the collector surface 642.

In this example, a tee joint is used to evenly split the flow between the first and second liquid supply lines 656, 654. As a result, the first and second flows are substantially equal. In one example, the flow from the main liquid supply line 652 is approximately 0.5 L/minute and is split into a first and second flow of approximately 0.25 L/minute each.

In some embodiments, the flow from the main liquid supply line 652 is split into a first flow and a second flow that are not substantially equal to each other. For example, a flow control or fixed fluid restrictor may be used to produce a first flow that is different from the second flow. This may be advantageous in some scenarios. For example, if the collector surface of the solar collector has a larger than normal amount of accumulated particulate material, the first flow of cleaning liquid may be increased with respect to the second flow to provide the first liquid-dispensing unit 621 with additional cleaning liquid.

FIG. 7B depicts an alternative embodiment that reuses liquid dispensed from the second liquid-dispensing unit 622 to feed the first liquid-dispensing unit 621. As mentioned above, this configuration has the additional benefit of reducing the amount of cleaning liquid used to clean the collector surface 642 of the solar collector 644, which reduces the amount of liquid resources required. Additionally, by reducing the amount of cleaning liquid used, more solar collectors can be cleaned without refilling, improving labor efficiency and cleaning time. Reducing the cleaning liquid may also reduce the reservoir liquid capacity needed to clean a fixed area.

As shown in FIG. 7B, the main liquid supply line 652 provides a flow of cleaning liquid from a liquid source, such as a backpack liquid supply unit 300, as discussed above with respect to FIG. 6. In the embodiment depicted in FIG. 7B, the main liquid supply line 652 provides a flow of cleaning liquid directly to the second liquid-dispensing unit 622. As discussed above, the second liquid-dispensing unit 622 includes one or more nozzles or orifices for spraying the cleaning liquid on an area of the collector surface 642 of the solar collector 644.

As shown in FIG. 7B, liquid dispensed from the second liquid-dispensing unit 622 is sprayed on an area between the first and second squeegee elements 611, 622. As discussed above with respect to FIG. 2, as the cleaning head is moved across the collector surface 642, the area between the first and second squeegee elements 611, 612 typically corresponds to the portion of the collector surface 642 that is being wetted by the cleaning liquid a second time. Accordingly, the cleaning liquid present in the area between the first and second squeegee elements 611, 612 typically contains a lower concentration of particulate suspended in a volume of cleaning liquid as compared to the concentration of suspended particulate in a wetted area near the first liquid-dispensing units 621. Because there is a relatively low concentration of suspended particulate, the liquid can be retrieved and reused to clean other portions of the collector surface 642.

Specifically, in this example, the cleaning head includes a liquid retrieval element 658 for removing at least some of the liquid between the first and second squeegee elements 611, 612. The liquid retrieval element 658 is connected to a pump 654 to assist in removing at least a portion of the liquid that pools in the area between the first and second squeegee elements 611, 612. The pump 654 may be a diaphragm pump or other vacuum-generating device for supplying a reduced pressure at the liquid retrieval element 658. In some cases, the pump 654 is located on the backpack liquid supply unit.

In some scenarios, if the solar collector 644 is installed at an angle, the liquid retrieval element 658 may be located at the lower edge of the solar collector 644 and includes a trough or open receptacle for collecting liquid that drains from the area between the first and second squeegee elements 611, 612. In some cases, both a vacuum and trough are used for collecting the liquid.

As shown in FIG. 7B, liquid collected by the liquid retrieval element 658 is re-routed to the first liquid-dispensing units 621 by redistribution supply line 662. As discussed above, the second liquid-dispensing unit 622 includes one or more nozzles or orifices for spraying the cleaning liquid on an area of the collector surface 642 of the solar collector 644. Optionally or additionally, a portion of the flow provided by the main liquid supply line 652 is diverted to the second liquid-dispensing unit 622 by supplemental supply line 660 (drawn as a dotted line in FIG. 7B).

Another potential benefit of retrieving the cleaning liquid is that the liquid can be visually inspected to determine the degree of contamination or soiling on the collector surface. The retrieved cleaning liquid can also be collected for further analysis to determine more information about the type of particulate that has accumulated on the collector surface.

8. Robotic Cleaning Device

Figure 8:
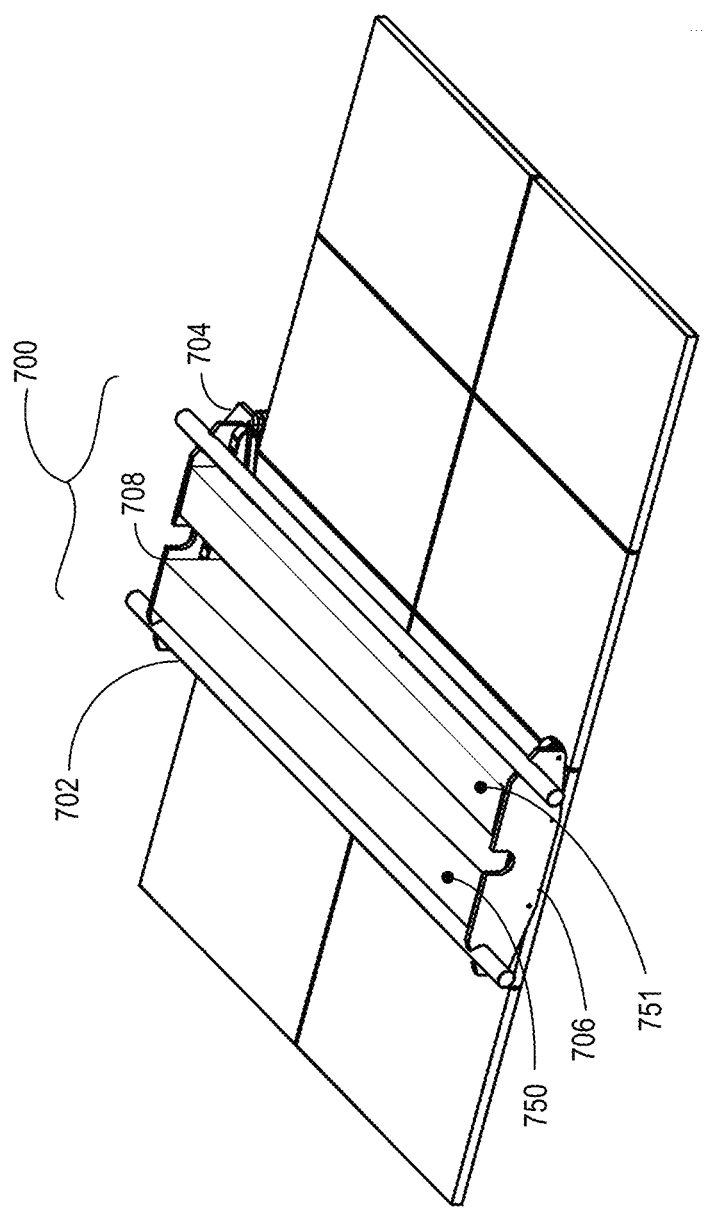
FIG. 8 depicts an exemplary robotic cleaning device for cleaning a row of solar collectors.

FIG. 8 depicts an exemplary robotic cleaning device for cleaning a row of solar collectors. The robotic cleaning device 700 depicted in FIG. 8 is configured to clean a row of solar collectors by traversing across the collector surface of the array of solar collectors and cross gaps between adjacent solar collectors. Typically, the array of solar collectors is installed at an inclined angle having an upper edge that is elevated with respect to a lower edge.

The robotic cleaning device 700 includes one or more cleaning modules 750 and 751 for cleaning the collector surfaces of the array of solar collectors. The cleaning modules include one or more components for removing accumulated particulate from the collector surface of a solar collector. Exemplary cleaning modules 850 and 851, featuring a dual-squeegee configuration, are discussed in more detail below with respect to FIG. 10. However, other cleaning modules could also be implemented in the robotic cleaning device 700 that do not, for example, involve a dual-squeegee configuration.

Figure 9:
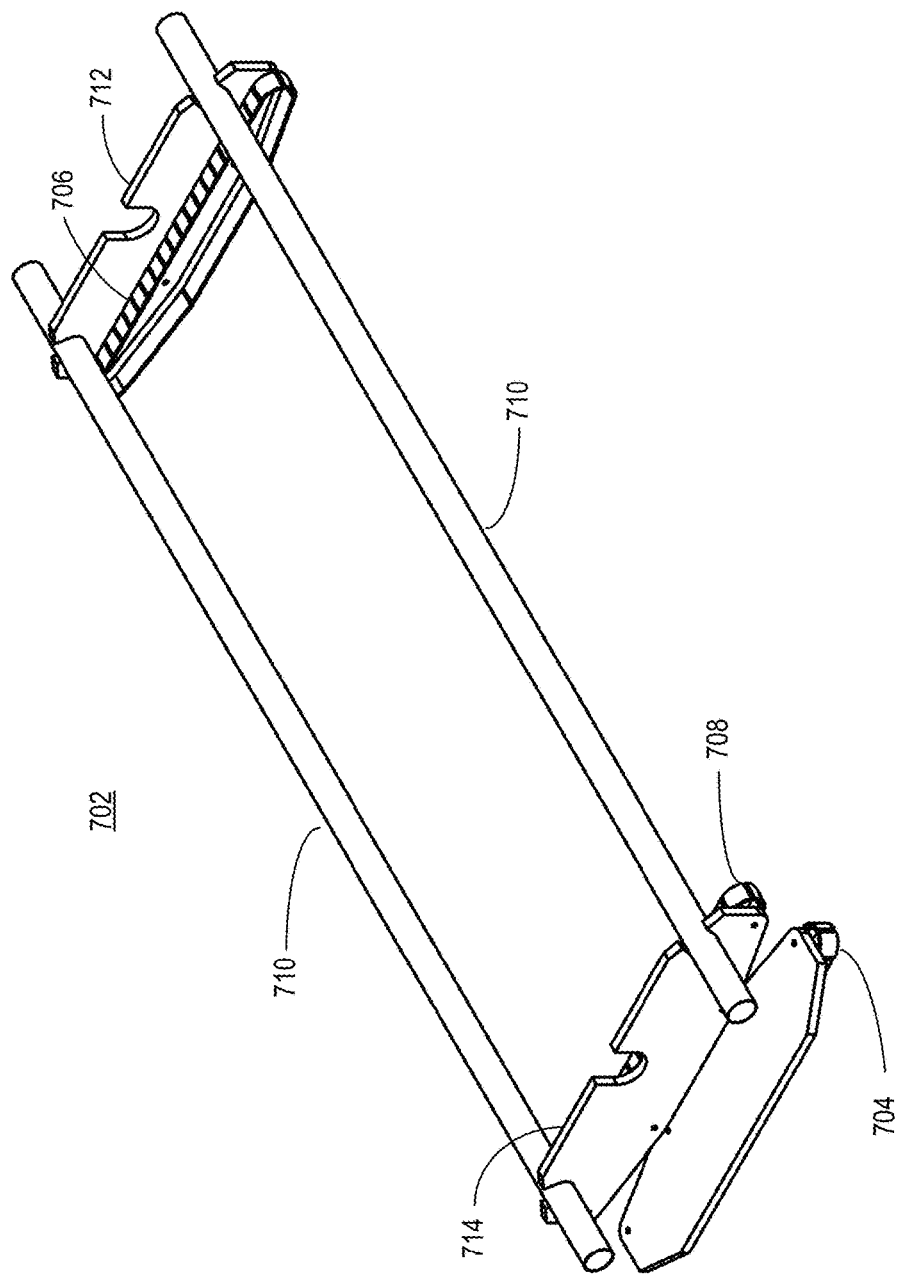
FIG. 9 depicts an exemplary frame of a robotic cleaning device.

As depicted in FIGS. 8 and 9, the robotic cleaning device 700 includes an upper guide mechanism 704 configured to traverse along the upper edge of the array of solar collectors. In general, the upper guide mechanism 704 prevents the robotic cleaning device from sliding off the inclined solar collector array and assists in positioning the robotic cleaning device 700. In this example, the upper guide mechanism 704 includes a continuous track belt having a flattened region for contacting the upper edge of an array of solar collectors. The leading and trailing ends of the track belt are beveled at an angle to assist in transitioning the robotic cleaning device 700 across gaps between solar collectors. In other embodiments, the guide mechanism may include a row of polyurethane rollers having a diameter sufficiently large to roll across gaps between adjacent solar collectors.

The upper guide mechanism 704 is mechanically joined to the frame 702 that supports the components used to clean the collector surface of the solar collector. In this example, the frame 702 is joined to the upper guide mechanism 704 via a pivot joint that allows the frame 702 to rotate with respect to the upper edge of the solar collector. In other embodiments, the upper guide mechanism 704 is rigidly jointed to the frame 702.

The robotic cleaning device 700 is positioned along the array of solar collectors using two continuous track mechanisms. The frame 702 includes a front continuous track mechanism 706 disposed at the front, lower edge of the array of solar collectors and a rear continuous track mechanism 708 disposed at the rear, upper edge of the array of solar collectors. Each continuous track mechanism 704, 706, 708 includes an independently controllable drive motor configured to drive a continuous track belt in either direction. The robotic cleaning device 700 can be steered by, for example, driving the two continuous track mechanisms 706, 708 at different speeds with respect to each other. In some cases, drive for the upper guide mechanism 704 is electrically or mechanically coupled to the drive of either the front or rear continuous track mechanisms 706, 708. In some cases, the upper guide mechanism 704 does not include a drive and is a free-rolling mechanism.

As shown in FIG. 8, the continuous track mechanisms 706, 708 each contact the collector surface via a continuous track belt having a flattened region. The flattened region helps distribute the weight of the robotic cleaning device 700 across the collector surface and reduces the risk of damage. The flattened region also provides a large surface to improve traction when the collector surface is wet. The continuous track mechanisms 706, 708 also have a beveled lead and trail portions to assist in traversing the gaps between adjacent solar collectors. In particular, the beveled lead and trail portions of the continuous track mechanisms 706, 708 help convey the robotic cleaning device 700 over gaps between adjacent solar collectors that are at different heights. In the present embodiment, the lead and trail portions are beveled at a 10-degree angle. In other embodiments, the lead and trail portions may be beveled as much as 15 degrees or more, depending on the traction provided by the continuous track belt.

In the present embodiment, the continuous track belt is made from multiple links joined together to form a chain. The surface of the continuous track belt is configured for gripping the solar collector without damaging the collector surface. The continuous track belt includes rubberized coating that provides a safe, frictional interface between the robotic cleaning device 700 and the collector surface. In other embodiments, the continuous track belt may be made from an endless belt made from a polymer or rubberized material.

The robotic cleaning device 700 includes two optical sensors configured to detect the gap between adjacent solar collectors. The optical sensors are used to provide positional feedback for the robotic cleaning device 700. In the present embodiment, the optical sensors are configured to detect gaps between adjacent solar collectors and can also detect the edge of a solar collector array. The optical sensors can also be used to prevent the robotic cleaning device 700 from driving past the end of the solar collector array.

In one implementation, the optical sensors are used to maintain the orientation of the robotic cleaning device 700 with respect to the array of solar collectors. For example, two optical sensors may be positioned toward the front and rear ends of the frame 702, respectively. Each optical sensor may produce a characteristic response signal when the sensor passes over a gap between adjacent solar collectors indicating a detection of the gap. The timing difference between the front and rear sensor response signals may indicate the orientation of the robotic cleaning device 700 with respect to the array of solar collectors. For example, the robotic cleaning device 700 may be oriented on the array of solar collectors with the lower, front end of the device leading the upper, rear end of the device. In this configuration, the front sensor will detect a gap between adjacent solar collectors before the rear sensor detects the same gap. The timing between the response signals of the two sensors indicates the relative angle of the robotic cleaning device 700 with respect to the array of solar collectors.

The relative timing of the sensor response signals may be compared using a computer processor or other electronic circuitry and the response signals may be used to adjust the relative speed of the continuous track mechanisms 706, 708 to maintain a fixed orientation of the robotic cleaning device 700. In one example, a phase-locked loop (PLL) control circuit can be used to provide a variable speed control signal to one or both of the continuous track mechanisms 706, 708 in response to the signals produced by the sensors. Using a PLL control circuit, a relative increase or decrease in the timing between the sensor response signals may trigger a corresponding increase or decrease in the relative speed between the continuous track mechanisms 706, 708.

The optical sensors may also be used for purposes other than gap detection. In some implementations, the optical sensor may identify the location of the robotic cleaning device 700 along the array of solar collectors. For example, the optical sensors may detect a location marker or other optical fiducial that represents a known location along the array of solar collectors. The optical sensors may also be used to sense an identification mark on the collector surface indicating a serial number or other form of equipment identification. The sensors may also be used to estimate the quantity of particulate that has accumulated on the collector surface and help determine whether cleaning is necessary and how much cleaning should be performed.

Although the present embodiment uses optical sensors, other sensors could also be used including, without limitation, proximity sensors, capacitive sensors, inductive sensors, hall-effect sensors, limit switches, mechanical sensors, and the like. In some embodiments, the sensors are configured to detect changes in material near the collector surface. For example, the sensor may be configured to detect changes from the glass surface of the collector surface to the metal frame around the collector panel perimeter.

FIG. 9 depicts the frame 702 of robotic cleaning device 700 without the cleaning modules. Note that the orientation of the frame 702 is rotated with respect to the view depicted in FIG. 8. As shown in FIG. 9, the frame includes an upper guide mechanism 704 disposed near the rear portion of the frame 702 for traversing the upper edge of a solar collector array. The frame also includes front and rear continuous track mechanisms 706, 708 disposed near the front and rear ends of the frame 702, respectively.

As shown in FIG. 9, the front and rear continuous track mechanisms 706, 708 are attached to end plates 712, 714. The end plates 712, 714 are structurally joined by two lateral beams 710. The end plates 712, 714 may be attached to the lateral beams 710 by a clamping mechanical interface that allows the plates to be unclamped and moved along the length of the lateral beams 710 to change the distance between the upper and lower continuous track mechanisms 706, 708. In this way, the robotic cleaning device 700 may be adapted to fit a variety of differently sized solar collectors.

The frame 702 may include one or more integrated liquid reservoirs for storing cleaning liquid or other liquids used for cleaning the collector surface. For example, one or both lateral beams 710 may be formed from a hollow tube structure that is sealed at both ends to provide a sealed internal cavity. The internal cavity may be used to store the cleaning liquid used in the cleaning operations. In some embodiments, the end plates are also formed from a hollow structure (e.g., a box structure) that is sealed and can also be used as a liquid reservoir. By integrating liquid reservoirs into structural components of the robotic cleaning device 700, the overall weight of the robotic cleaning device 700 may be reduced. Additionally, the number of parts may be reduced, simplifying manufacturing and reducing part costs.

9. Exemplary Cleaning Modules for a Robotic Cleaning Device

Figure 10:
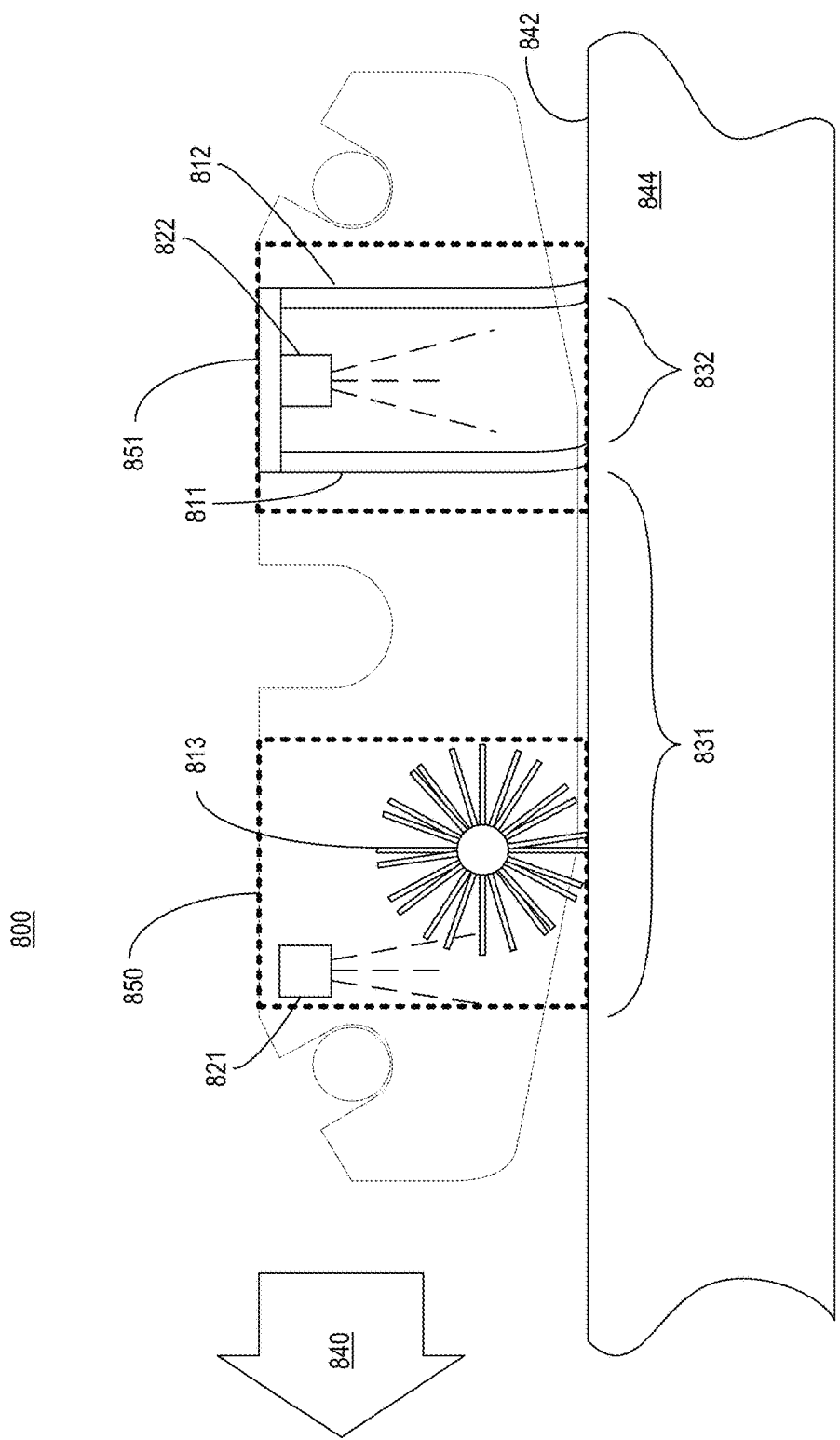
FIG. 10 depicts a schematic diagram of exemplary cleaning modules for a robotic cleaning device.

As previously mentioned, a robotic cleaning device typically includes one or more cleaning modules for cleaning the collector surfaces of the array of solar collectors. FIG. 10 depicts a schematic diagram of exemplary cleaning modules 850 and 851 that can be integrated into the frame of a robotic cleaning device 800.

As shown in FIG. 10, cleaning module 850 includes a brush element 813 and a first liquid-dispensing unit 821. The brush element 813 has a longitudinal side oriented along a first direction substantially perpendicular to the drive direction 840. Cleaning module 851 includes a first squeegee element 811 and a second squeegee element 812 separated by a gap. A second liquid-dispensing unit 822 is disposed in the gap between the first squeegee element 811 and the second squeegee element 812. A cleaning liquid is applied to the collector surface 842 of the solar collector 844 using the first and second liquid-dispensing unit 821, 822.

In this example, as the robotic cleaning device 800 is moved across the collector surface 842 in a drive direction 840, two cleaning areas are created: a low-dilution area 831 and a high-dilution area 832. As shown in FIG. 10, the low-dilution area 831 precedes the high-dilution area 832 as the robotic cleaning device 800 is moved in the drive direction 840. As the robotic cleaning device 800 is driven, the first squeegee element 811 acts as a liquid barrier and separates the low-dilution area 831 from the high-dilution area 832.

As shown in FIG. 10, the low-dilution area 831 corresponds to a portion of the collector surface 842 near the first liquid-dispensing unit 821, a portion of the collector surface 842 under the brush element 813, and extends toward the first squeegee element 811. In a typical implementation, the first liquid-dispensing unit 821 delivers a first spray to a dry area of the collector surface 842. After being wetted by the first liquid-dispensing unit 821, the brush element 813 is used to dislodge particulate material that has accumulated on the collector surface 842 of the solar collector 844. As a result, the liquid present in the low-dilution area 831 typically contains a relatively high concentration of particulate material suspended in a volume of cleaning liquid. As the robotic cleaning device 800 is driven across the collector surface 842, a large portion of the cleaning liquid and suspended particulate material are removed by the first squeegee 811.

As shown in FIG. 10, the high-dilution area 832 is located on a side of the first squeegee element 811 opposite to the low-dilution area 831 and includes the area between the first squeegee element 811 and the second squeegee element 812. In a typical implementation, the high-dilution area 832 corresponds to the portion of the collector surface 842 that is being wetted by the cleaning liquid a second time. Accordingly, the cleaning liquid present in the high-dilution area 832 typically contains a lower concentration of particulate suspended in a volume of cleaning liquid as compared to the concentration of suspended particulate in the low-dilution area 831. As the robotic cleaning device 800 is driven across the collector surface 842, nearly all of the liquid and suspended particulate material are removed by the second squeegee element 812.

If the solar collector 844 is installed on an incline, the liquid and suspended particulate material removed by the second squeegee element 812 may drain from the high-dilution area 832 by gravity. In some embodiments, the removed liquid may be collected and re-routed back to the first liquid-dispensing units. An example of a re-routing configuration is discussed with respect to the liquid routing scheme depicted in FIG. 7B and the process 1100 described with respect to FIG. 11B.

As shown in FIG. 10, the brush element 813 may be a rotating brush having bristles extending radially from a central shaft or rod. In some embodiments, the bristles of the rotating brush may be arranged in a helical pattern down the length of the central shaft or rod. The helical arrangement of the bristles may generally push the cleaning liquid on the collector surface 842 toward one end of the robotic cleaning device 800 using an auger motion. If the robotic cleaning device 800 is installed on an inclined solar collector, the helical arrangement of bristles may auger or push the cleaning liquid up the incline as the brush is rotated. This configuration helps prevent the cleaning liquid from draining off the collector surface too quickly and may allow the robotic cleaning device 800 to clean the collector surface using a lower quantity of cleaning liquid.

FIG. 10 depicts one exemplary arrangement of cleaning modules 850 and 851. However, in some embodiments the cleaning modules are integrated into a single cleaning module. Additionally, the cleaning modules may be configured to be manually or automatically lifted from the collector surface 842 to allow the robotic cleaning device 800 to traverse over gaps between adjacent solar collectors or other obstructions.

The robotic cleaning device 800 may also be configured for bi-directional operation. For example, a dual-squeegee cleaning module similar to module 851 may be arranged on either side of a brush cleaning module similar to module 850. One of the dual-squeegee cleaning module may be manually or automatically lifted from the collector surface 842, depending on the direction of travel.

10. Processes of Cleaning the Collector Surface of a Solar Collector

Figure 11B:
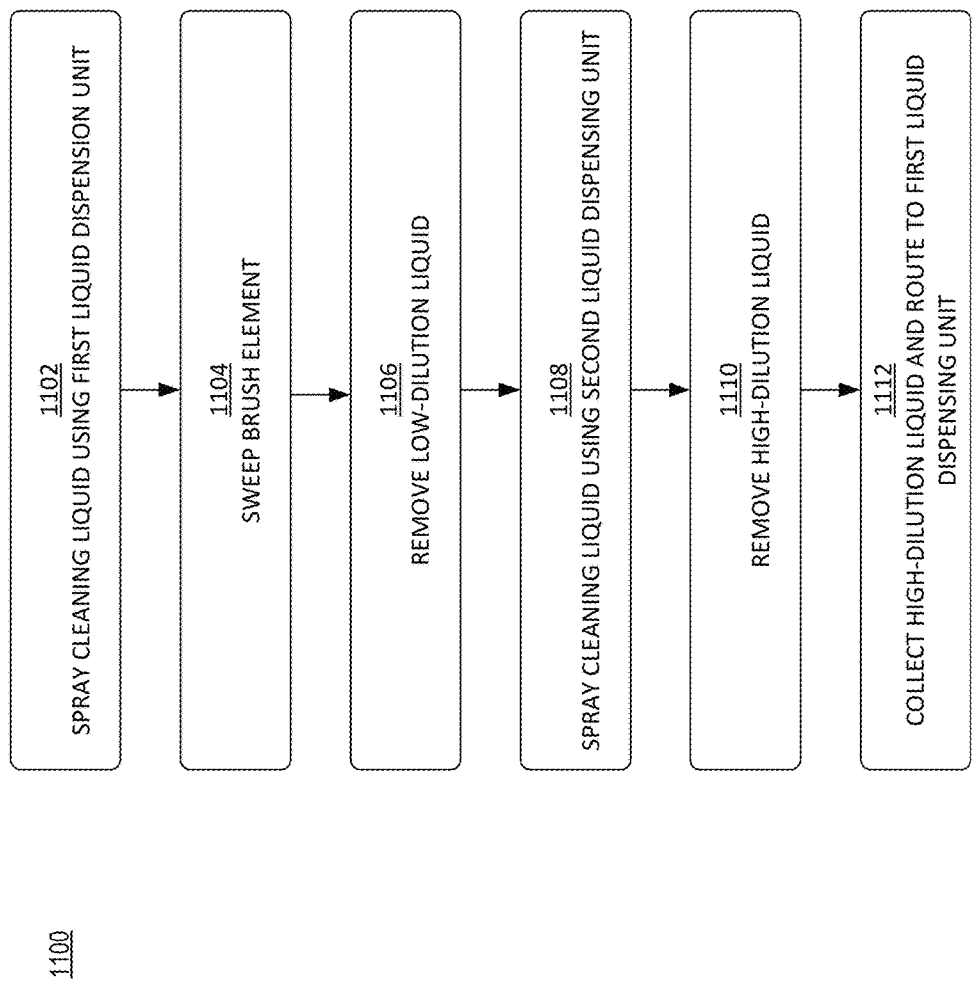

FIGS. 11A and 11B depict flowcharts for exemplary processes for cleaning the collector surface of a solar collector in a single pass using a dual-squeegee configuration. As discussed above, it may be advantageous to provide a technique for cleaning a solar collector in a single pass. Cleaning a solar collector in a single pass may also reduce the amount of liquid resources required and improve the efficiency of the cleaning system. Specifically, the processes discussed below may result a reduced amount of cleaning liquid and reduced amount of labor, compared to some traditional cleaning techniques.

FIG. 11A depicts a flowchart of an exemplary process 1000 for cleaning the collector surface of a solar collector. Process 1000 may be performed using the two-squeegee configuration discussed previously. Specifically, process 1000 may be performed using the hand-held cleaning system of FIGS. 1A-1C, 2, 3A-3B, 6A and, alternatively, the robotic cleaning system of FIG. 10. For purposes of this discussion, process 1000 is described with respect to the cleaning head 210 and components depicted in FIG. 2.

Process 1000 is typically performed on a solar collector that needs cleaning. That is, the collector surface typically has at least some amount of debris or particulate material that has been deposited on the collector surface over a period of time. The particulate material may be dust or dirt that has been blown by the wind or settled from the surrounding atmosphere. As discussed above, the debris and particulate material may block light that would otherwise be incident on the collector surface, thereby reducing the efficiency of the solar collector.

The following operations are performed while sweeping a cleaning head across at least a portion of the collector surface in a first direction. Using the cleaning head 210 described above with respect to FIG. 2, multiple operations typically occur simultaneously. However, it is not necessary that all of the operations be performed simultaneously, and operations may start and stop at different times as the cleaning head is swept across the collector surface.

In operation 1002, cleaning liquid is sprayed on the collector surface of the solar collector. With reference to FIG. 2, the cleaning liquid is sprayed using a first liquid-dispensing unit 221 comprising one or more nozzles attached to the cleaning head 210 and directed toward to collector surface 242 of the solar collector 244. In one example, the first liquid-dispensing unit includes a drip-rail-type dispensing nozzle that dispenses 0.5 L/minute of cleaning liquid.

In operation 1004, a brush element is swept across the collector surface. The brush typically agitates the cleaning liquid and dislodges the particulate material that has been deposited on the collector surface. While at least some of the particulate material may become suspended in the cleaning liquid, not all of the particulate material may be removed from the surface of the collector surface in this operation. With reference to FIG. 2, the brush element 213 is attached to the cleaning head 210 adjacent to the first liquid-dispensing unit 221.

In operation 1006, at least a portion of the liquid sprayed by the first liquid-dispensing unit and at least a portion of the particulate material is removed using a first squeegee element. With reference to FIG. 2, the first squeegee element 211 is attached to the cleaning head 210 adjacent to the brush element 213 on a side opposite to the first liquid-dispensing unit 221. As discussed previously with respect to FIG. 2, the liquid removed by the first squeegee element 211 typically contains a relatively high concentration of particulate material suspended in the cleaning liquid and may also be referred to as a low-dilution liquid.

A significant portion of the low-dilution liquid is removed by the first squeegee element 211. Typically, more than 95 percent of the liquid and 95 percent of the particulate material are removed by the first squeegee element 211. In some embodiments, more than 98 percent of the liquid and 98 percent of the particulate material are removed by the first squeegee element 211. In some embodiments, more than 99 percent of the liquid and 99 percent of the particulate material are removed by the first squeegee element 211.

In operation 1008, cleaning liquid is sprayed on the collector surface of the solar collector. With reference to FIG. 2, the cleaning liquid is sprayed using a second liquid-dispensing unit 222 comprising one or more nozzles attached to the cleaning head 210 and directed toward to a portion of the collector surface 242 located between the first and second squeegee elements 211, 222. In one example, the second liquid-dispensing unit includes a drip-rail type dispensing nozzle that dispenses approximately 0.5 L/minute of cleaning liquid.

In operation 1010, nearly all of the remaining liquid and particulate material is removed using a second squeegee element. With reference to FIG. 2, the second squeegee element 212 is attached to the cleaning head 210 adjacent to the first squeegee element 211 on a side opposite to the brush element 213. As discussed previously with respect to FIG. 2, the liquid removed by the second squeegee element 212 typically contains a lower concentration of particulate suspended in the cleaning liquid compared to the concentration of suspended particulate in the low-dilution liquid. The liquid between the first and second squeegee elements 211, 212 is also referred to as a high-dilution liquid.

Nearly all of the high-dilution liquid is removed by the second squeegee element 212. Typically, more than 95 percent of the liquid and 95 percent of the particulate material are removed by the second squeegee element 212. In some embodiments, more than 98 percent of the liquid and 98 percent of the particulate material are removed by the second squeegee element 212. In some embodiments, more than 99 percent of the liquid and 99 percent of the particulate material are removed by the second squeegee element 212.

If all or nearly all of the particulate material is removed by process 1000, the collector surface of the solar collector can be cleaned in a single sweep of the cleaning head. If the cleaning head is configured to have a length approximately the same as the length of the solar collector, the entire collector can be cleaned in a single sweep by moving the cleaning head in one substantially linear direction across the width of the solar collector.

FIG. 11B depicts an alternative process 1100 for cleaning the collector surface of a solar collector by collecting and re-routing cleaning liquid that has been applied to the collector surface. Process 1100 is similar to process 1000 but has the additional benefit of collecting and reusing a portion of the cleaning liquid, which reduces the amount of cleaning liquid required to clean a collector surface of the solar collector.

As with process 1000, process 1100 may be performed using the two-squeegee configuration discussed previously. In particular, FIG. 6B depicts an exemplary liquid routing schematic that can be used to perform aspects of process 1100. In addition, process 1100 may be performed using the hand-held cleaning system of FIGS. 1A-1B, 2, 3A-3B, 7B and, alternatively, the robotic cleaning system of FIG. 10. For purposes of this discussion, process 1100 is described with respect to the liquid routing schematic depicted in FIG. 7B.

As with process 1000, process 1100 is typically performed on a solar collector that needs cleaning. That is, the collector surface typically has at least some amount of debris or particulate material that has been deposited on the collector surface over a period of time. The following operations are performed while sweeping a cleaning head across at least a portion of the collector surface in a first direction. As discussed above with respect to process 1000, the multiple operations of process 1100 typically occur simultaneously, but it is not necessary that all of the operations start and stop at the same time.

In operation 1102, cleaning liquid is sprayed on the collector surface of the solar collector. With reference to FIG. 7B, the cleaning liquid is sprayed using a first liquid-dispensing unit 621 comprising one or more nozzles attached to the cleaning head 610 and directed toward to collector surface 642 of the solar collector 644. In this example, the first liquid-dispensing unit is provided with a flow of cleaning liquid by the pump 654, which draws liquid from the area between the first and second squeegee elements 611, 612.

In operation 1104, a brush element is swept across the collector surface. The brush element typically agitates the cleaning liquid and dislodges the particulate material that has been deposited on the collector surface. This operation is substantially similar to operation 1004, discussed above with respect to FIG. 11A.

In operation 1106, at least a portion of the liquid sprayed by the first liquid-dispensing unit and at least a portion of the particulate material is removed using a first squeegee element. This operation is substantially similar to operation 1006, discussed above with respect to FIG. 11A.

In operation 1108, cleaning liquid is sprayed on the collector surface of the solar collector. With reference to FIG. 7B, the cleaning liquid is sprayed using a second liquid-dispensing unit 622 comprising one or more nozzles attached to the cleaning head and directed toward to a portion of the collector surface 642 located between the first and second squeegee elements 611, 622. In this example, the second liquid-dispensing unit is provided a flow of cleaning liquid by main liquid supply line 652.

In operation 1110, nearly all of the remaining liquid and particulate material is removed using a second squeegee element. With reference to FIG. 7B, the second squeegee element 612 is attached to the cleaning head adjacent to the first squeegee element 611 on a side opposite to the brush element. As discussed previously with respect to FIG. 2, the liquid removed by the second squeegee element 212 typically contains a lower concentration of particulate suspended in a the cleaning liquid as compared to the concentration of suspended particulate in the low-dilution liquid and is also referred to as a high-dilution liquid. This operation is substantially similar to operation 1010, discussed above with respect to FIG. 11A.

In operation 1112, the high-dilution liquid is collected from the area between the first and second squeegee elements. With reference to FIG. 7B, the high-dilution liquid may be collected using the liquid retrieval element 658. The liquid retrieval element 658 is connected to a pump 654 to assist in removing at least a portion of the liquid that pools in the area between the first and second squeegee elements 611, 612. In some cases, if the solar collector 644 is installed on an angle, the liquid retrieval element 658 may be located at the lower edge of the solar collector 644 and includes a trough or open receptacle for collecting liquid that drains from the area between the first and second squeegee elements 611, 612. In some cases, both a vacuum and trough are used for collecting the liquid.

In operation 1112, the high-dilution liquid is routed to the first liquid-dispensing unit. With reference to FIG. 7B, the redistribution supply line 662 is used to route the retrieved liquid to the first liquid-dispensing unit 621.

Figure 11C:
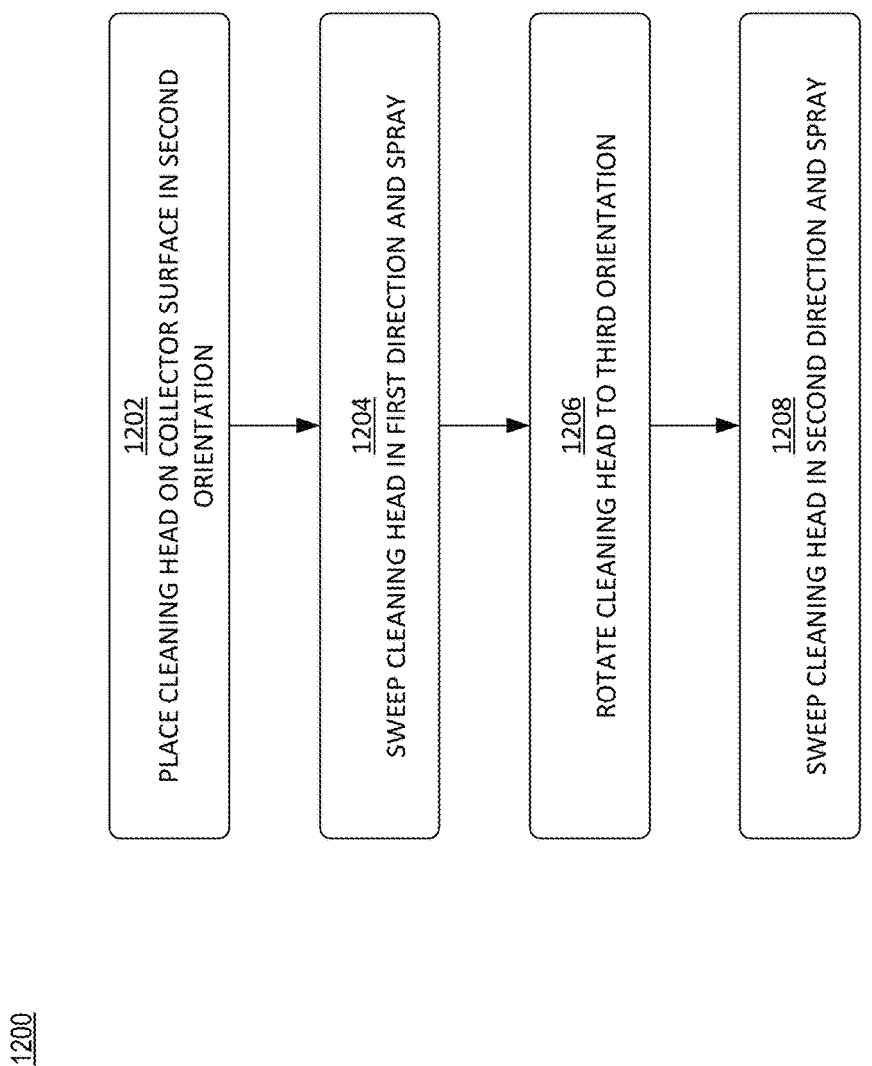

FIG. 11C depicts a flowchart for an exemplary process for cleaning the collector surface of a solar collector in two passes using a single-squeegee configuration. In some instances, it may be advantageous to perform a cleaning operation in two passes. For example, if an array of solar collectors is at an incline and is arranged so that the long edge of the solar collector is oriented along the incline, it may be easier to service the solar collectors from the lower edge of the inclined collectors. In this case, it may be efficient to perform the cleaning operation in two passes: first by lifting the cleaning head up the inclined surface of the solar collector and then lowering the cleaning head back down before cleaning the next collector in the array. Compare this to the processes discussed with respect to FIGS. 11A and 11B above, which may be implemented by walking alongside an array of solar collectors and performing the cleaning in a single pass.

FIG. 11C depicts a flow chart of an exemplary process 1200 for cleaning the collector surface by positioning a cleaning head in multiple orientations. Process 1200 may be performed using the cleaning head 410 configuration discussed above with respect to FIG. 4A. As with the other processes discussed above, process 1200 is typically performed on a solar collector that needs cleaning. That is, the collector surface typically has at least some amount of debris or particulate material that has been deposited on the collector surface over a period of time.

With respect to the following discussion, the second and third orientations of the cleaning head refer to the same orientations discussed above with respect the FIGS. 4A-C. As discussed above, the first orientation of the cleaning head 410 depicted in FIG. 4A corresponds to a position that places both the brush element 413 and squeegee element 411 in contact with the collector surface at the same time. The cleaning head 410 may be placed in the first orientation when the hand-held cleaning device 200 is initially placed on the collector surface or when the operator is resting.

In operation 1202, the cleaning head is placed on the collector surface in a second orientation. The second orientation corresponds to the orientation of the cleaning head 410, as depicted in FIG. 4B. In reference to FIG. 4B, in the second orientation, the cleaning head 410 places the brush element 413 in contact with the collector surface 442 and lifts the squeegee element 411 from the collector surface 442 so that there is a gap between the collector surface 442 and the squeegee element 411. The cleaning head 410 may be placed in the second orientation by, for example, the operator pushing down on the handle element 420.

In operation 1204, the cleaning head is swept in a first direction across the collector surface while in the second orientation. Typically, if the solar collector is inclined, the first direction is in an upward direction, sweeping the cleaning head from the lower edge toward the upper edge of the collector surface. While the cleaning head is swept, a cleaning liquid is also sprayed on the collector surface using a liquid-dispensing unit.

In operation 1204, the cleaning liquid may be dispensed at a rate of approximately 0.5 L/minute. The spray may be controlled by the operator using a hand-operated control valve, as discussed above with respect to FIG. 1A. With reference to FIG. 4B, the liquid-dispensing unit 421 may include one or more nozzles or orifices located in the gap between the squeegee element 411 and the brush element 413.

In operation 1204, the sweeping motion results in an initial wetting and cleaning of the collector surface. Because the cleaning head is placed in the second orientation, the weight of the hand-operated cleaning device and any force exerted by the operator is concentrated at the contact between the brush element and the collector surface. Thus, as the cleaning head is being swept, the brush typically agitates the cleaning liquid and dislodges the particulate material that has been deposited on the collector surface.

Because operation 1204 is typically the first cleaning pass of the cleaning head, the cleaning liquid typically contains a relatively high concentration of particulate material suspended in the cleaning liquid and may also be referred to as a low-dilution liquid. While at least some of the particulate material may become suspended in the cleaning liquid, not all of the particulate material may be removed from the surface of the collector surface in this operation.

In operation 1206, the cleaning head is rotated from the second orientation to the third orientation. Typically, the cleaning head is rotated by the operator by lifting the handle element away from the collector surface. FIG. 4C, discussed above, depicts the cleaning head 410 in the third orientation.

In operation 1208, the cleaning head is swept in a second direction (opposite the first direction) while in the third orientation. If the solar collector is inclined, as discussed above, the second direction is in a downward direction, sweeping the cleaning head from the upper edge toward the lower edge of the collector surface. While the cleaning head is swept, a cleaning liquid is also sprayed on the collector surface using a liquid-dispensing unit. As discussed previously, the spray may be controlled by the operator using a hand-operated control valve and may be dispensed at a rate of approximately 0.5 L/minute.

In operation 1208, the sweeping motion results in a second wetting and wiping of the collector surface. Because the cleaning head is placed in the third orientation, the weight of the hand-operated cleaning device and any force exerted by the operator is concentrated at the contact between the squeegee element and the collector surface. Thus, as the cleaning head is being swept, the squeegee element may dislodge and remove some remaining particulate material that was not removed by the brush in operation 1204.

As the cleaning head is being swept in operation 1208, a significant portion of the liquid is removed by the squeegee element 411. Typically, more than 95 percent of the liquid and 95 percent of the particulate material are removed by the squeegee element 411. In some embodiments, more than 98 percent of the liquid and 98 percent of the particulate material are removed by the squeegee element 411. In some embodiments, more than 99 percent of the liquid and 99 percent of the particulate material are removed by the squeegee element 411.

Although a feature may appear to be described in connection with a particular embodiment, one skilled in the art would recognize that various features of the described embodiments may be combined. Moreover, aspects described in connection with an embodiment may stand alone.

What is claimed is:

1. A robotic cleaning device configured to clean a row of inclined solar collectors, the robotic cleaning device configured to traverse across the row of inclined solar collectors, each of the inclined solar collectors having a collector surface, and to cross gaps between adjacent solar collectors in the row, the robotic cleaning device comprising:
   a first cleaning module configured to be swept along a portion of a collector surface of a solar collector, the first cleaning module comprising:
      a first liquid dispenser mounted on a leading edge of the first cleaning module and configured to deliver a first spray of cleaning liquid to the portion of the collector surface, and
      a brush element having a longitudinal side oriented along a first direction that is perpendicular to a direction in which the first cleaning module is swept, the brush element being disposed adjacent to the first liquid dispenser; and
   a second cleaning module configured to be swept at a constant interval behind the first cleaning module, the second cleaning module comprising:
      a first squeegee element oriented along the first direction and mounted at a leading edge of the second cleaning module, a first cleaning area being defined as an area between the first liquid dispenser of the first cleaning module and the first squeegee element of the second cleaning module;
      a second squeegee element oriented along the first direction and mounted on a trailing edge of the second cleaning module to form a second cleaning area between the first and second squeegee elements; and
      a second liquid dispenser mounted between the first and second squeegee elements and configured to deliver a second spray of liquid to the portion of the collector surface within the second cleaning area;
   a frame having a front end and a back end, the back end being configured to be disposed at a top of the row of inclined solar collectors and including a guide mechanism to prevent the robotic cleaning device from sliding from the row of inclined solar collectors;
   a front continuous track mechanism disposed at the front end of the frame, the front continuous track mechanism comprising a first rolling support, the front continuous track mechanism extending along a length of the frame in the first direction; and
   a rear continuous track mechanism disposed at the back end of the frame, the rear continuous track mechanism comprising a second rolling support, the rear continuous mechanism extending along the length of the frame in the first direction;
   wherein, via the first and second rolling supports, the front and rear continuous track mechanisms are configured to:

convey the first and second cleaning modules in a sweep direction along top surfaces of the row of inclined solar collectors, and convey the first and second cleaning modules across gaps between adjacent solar collectors in the row of inclined solar collectors, wherein the first liquid dispenser is configured to deliver the first spray within the first cleaning area and the second liquid dispenser is configured to deliver the second spray within the second cleaning area as the first and second cleaning modules are swept across collector surfaces of solar collectors in the row of inclined solar collectors, and wherein the robotic cleaning device further includes:

a front sensor disposed at the front end of the frame, the front sensor being configured to produce a front sensor response signal in response to detecting the gap between adjacent solar collectors of a row of solar collectors as the first and second cleaning modules are swept across collector surfaces of the row of solar collectors;

a rear sensor disposed at the back end of the frame, the rear sensor being configured to produce a rear sensor response signal in response to detecting the gap between the adjacent solar collectors of the row of solar collectors as the first and second cleaning modules are swept across the collector surfaces of the row of solar collectors in use; and a phase-locked loop control circuit configured to:
compare relative timings of the first sensor response signal and the rear sensor response signal, and
adjust the relative speed of the first and rear continuous track mechanisms based on the comparison of the relative timings of the front sensor response signal and the rear sensor response signal.

2. The robotic cleaning device of claim 1, wherein the brush element is a rotating brush element having bristles radially extending from a central rod.

3. The robotic cleaning device of claim 2, wherein the bristles of the brush element are arranged in a helical pattern, and the brush element is configured to auger cleaning liquid toward an upper end of the row of inclined solar collectors when the brush element is rotated.

4. The robotic cleaning device of claim 1, wherein the frame comprises:
one or more lateral beams arranged from the front to back end of the frame, wherein the one or more lateral beams are configured to mechanically joint the front and rear continuous track mechanisms.

5. The robotic cleaning device of claim 4, wherein the one or more lateral beams are formed from a hollow tubular structure, and the one or more lateral beams are at least partially filled with the cleaning liquid.

6. The robotic cleaning device of claim 1, wherein the phase-locked-loop control circuit is configured to increase a speed of either of the front and rear continuous track mechanisms in response to an increase in the timing difference between the front sensor response signal and the rear sensor response signal.

7. The robotic cleaning device of claim 1, wherein the phase-locked-loop control circuit is configured to decrease a speed of either of the front and rear continuous track mechanisms in response to an increase in the timing difference between the front sensor response signal and the rear sensor response signal.

* * * * *